Figure 20:
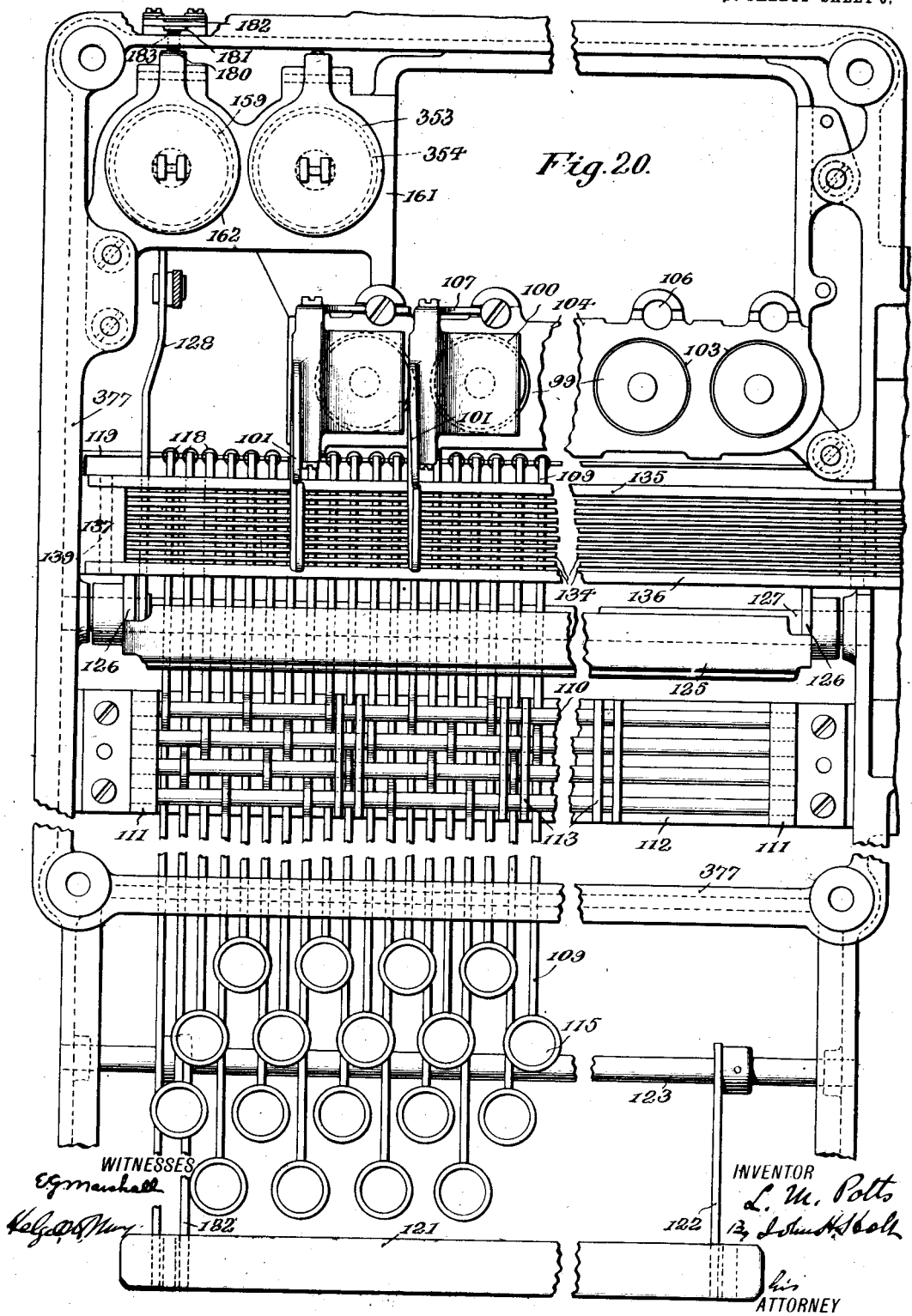

L. M. POTTS.
TELEGRAPHY.
APPLICATION FILED MAR. 6, 1911.
1,105,922.
Patented Aug. 4, 1914.
20 SHEETS—SHEET 1.
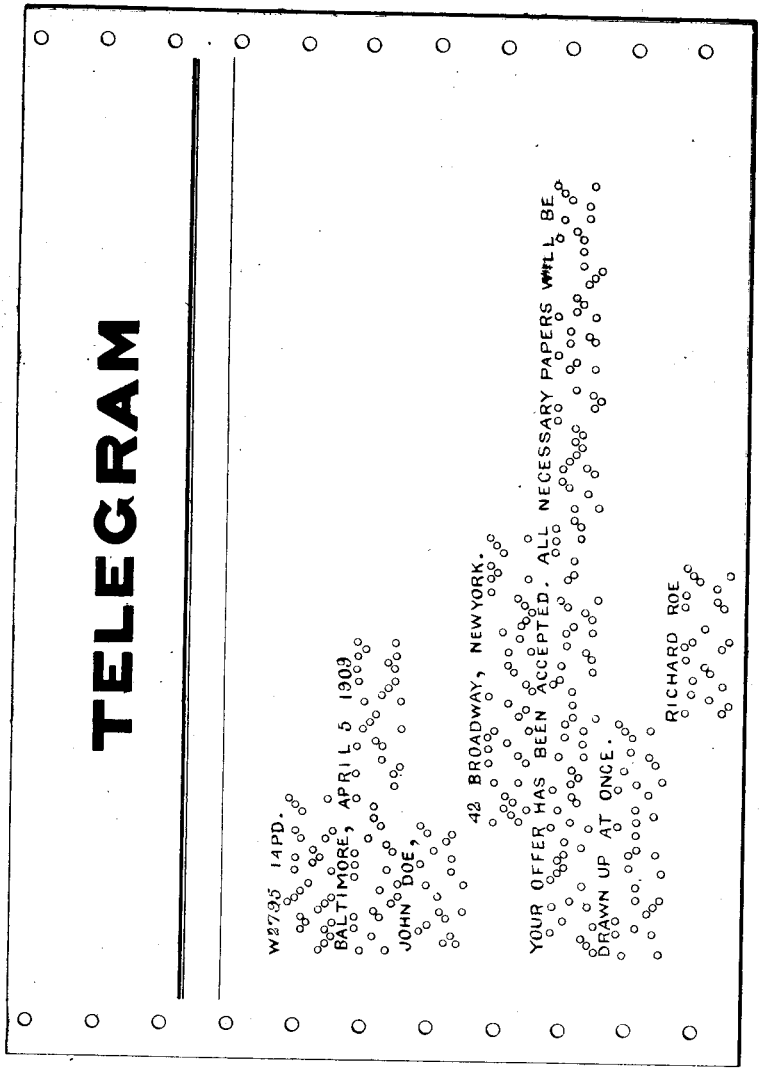
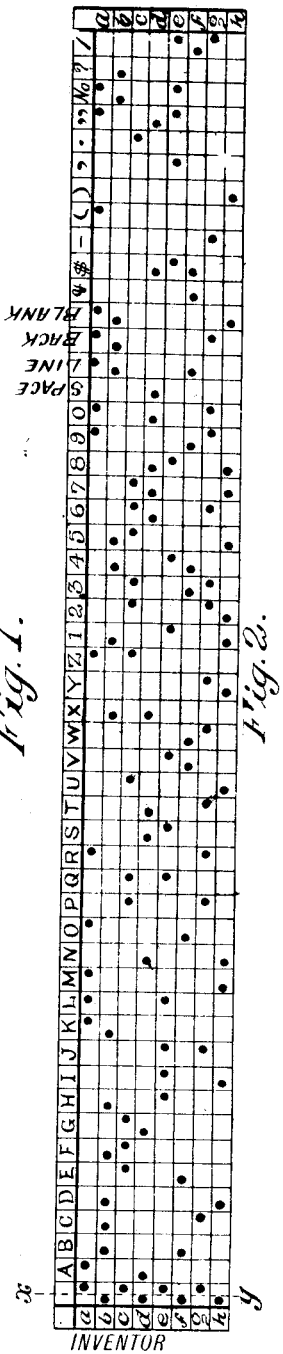
WITNESSES:
INVENTOR
L. M. Potts
BY
John H. Holt
his ATTORNEY L. M. POTTS.
TELEGRAPHY.
APPLICATION FILED MAR. 6, 1911.
1,105,922.
Patented Aug. 4, 1914.
20 SHEETS—SHEET 2.
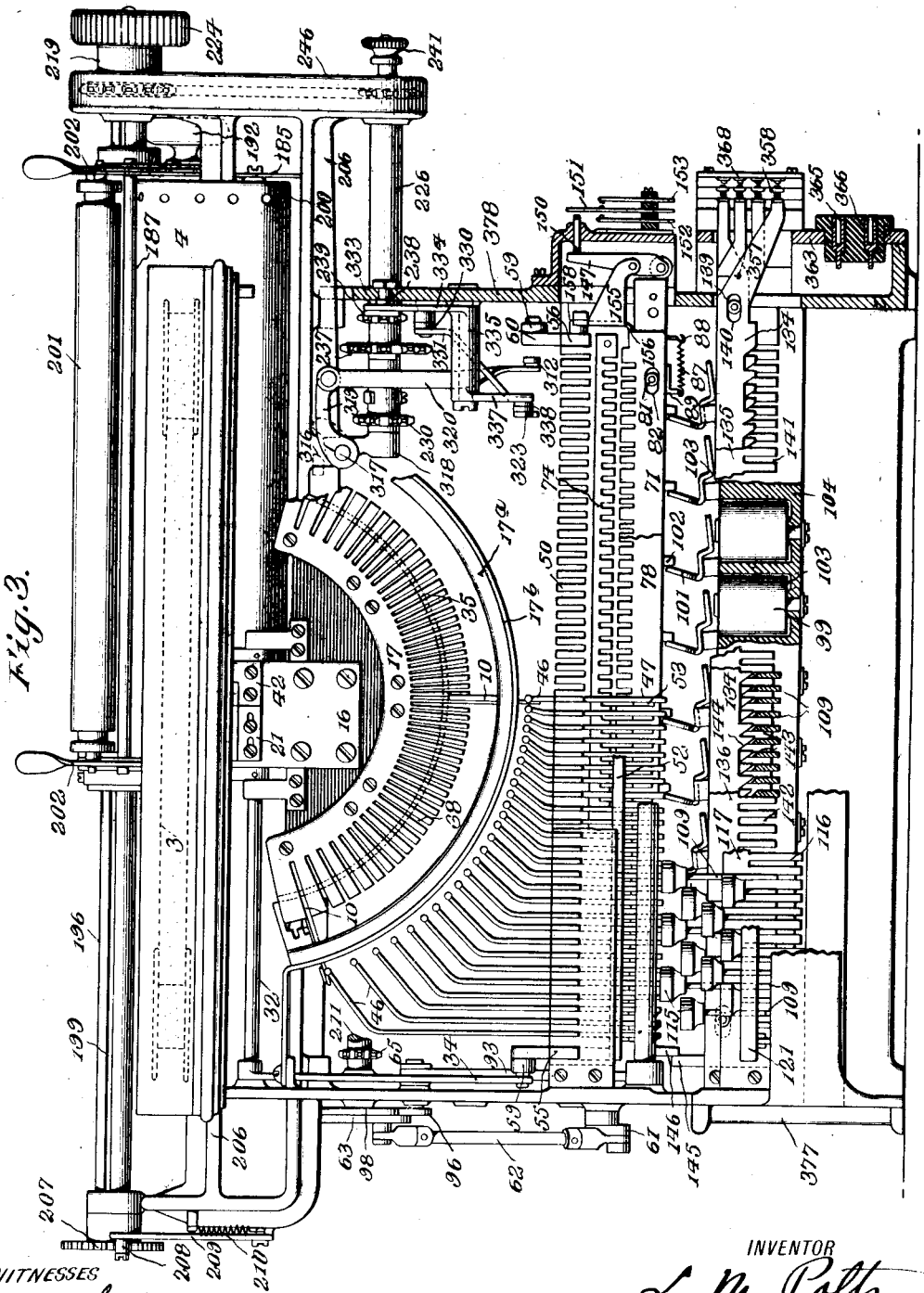
WITNESSES
INVENTOR
L. M. Potts
BY
John H. Holt
ATTORNEY

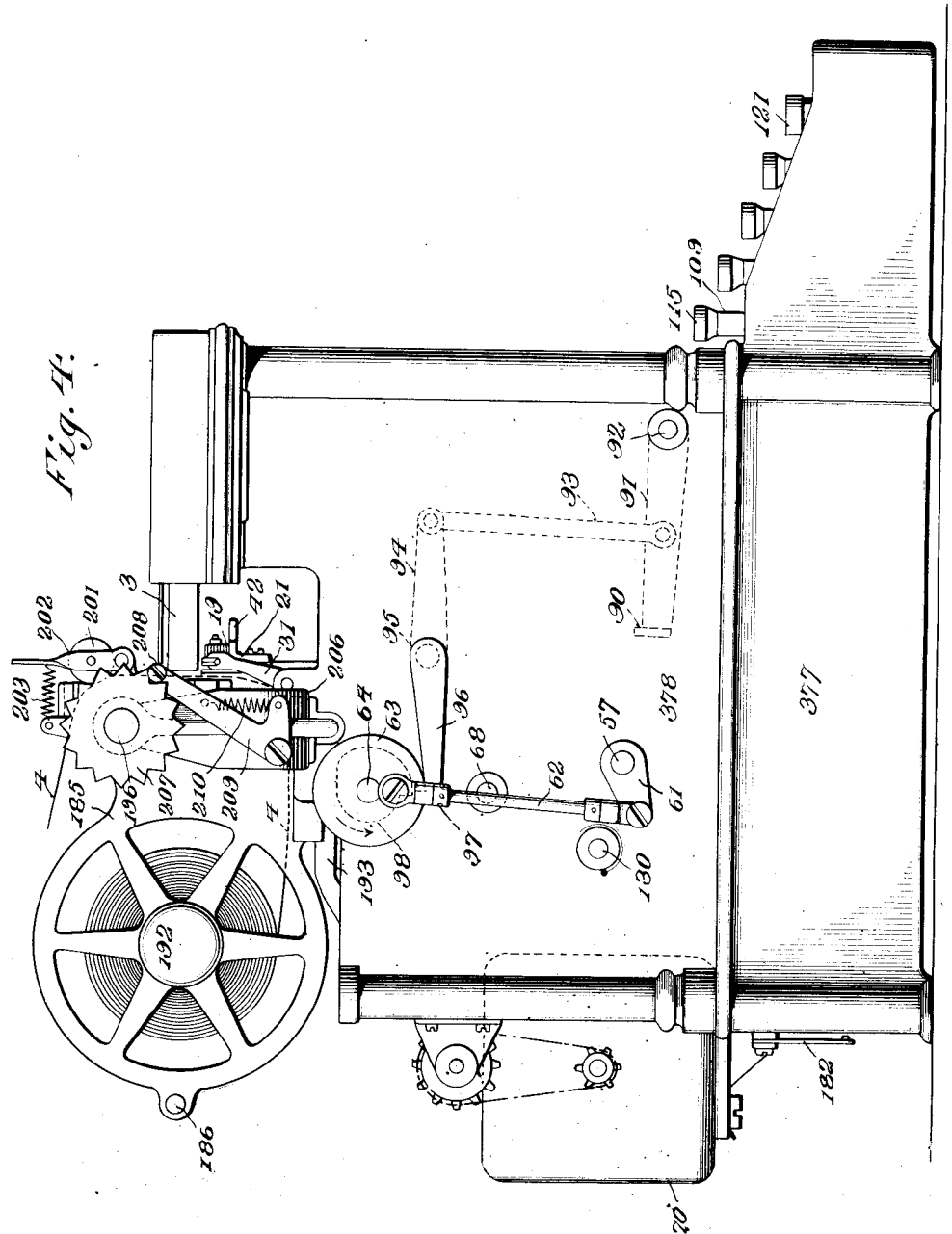
L. M. POTTS.
TELEGRAPHY.
APPLICATION FILED MAR. 6, 1911.
1,105,922.
Patented Aug. 4, 1914.
20 SHEETS—SHEET 3.
WITNESSES:
E.G. Marshall
INVENTOR
L. M. Potts
BY John H. Holt
ATTORNEY L. M. POTTS.
TELEGRAPHY.
APPLICATION FILED MAR. 6, 1911.
1,105,922.
Patented Aug. 4, 1914.
20 SHEETS—SHEET 4.
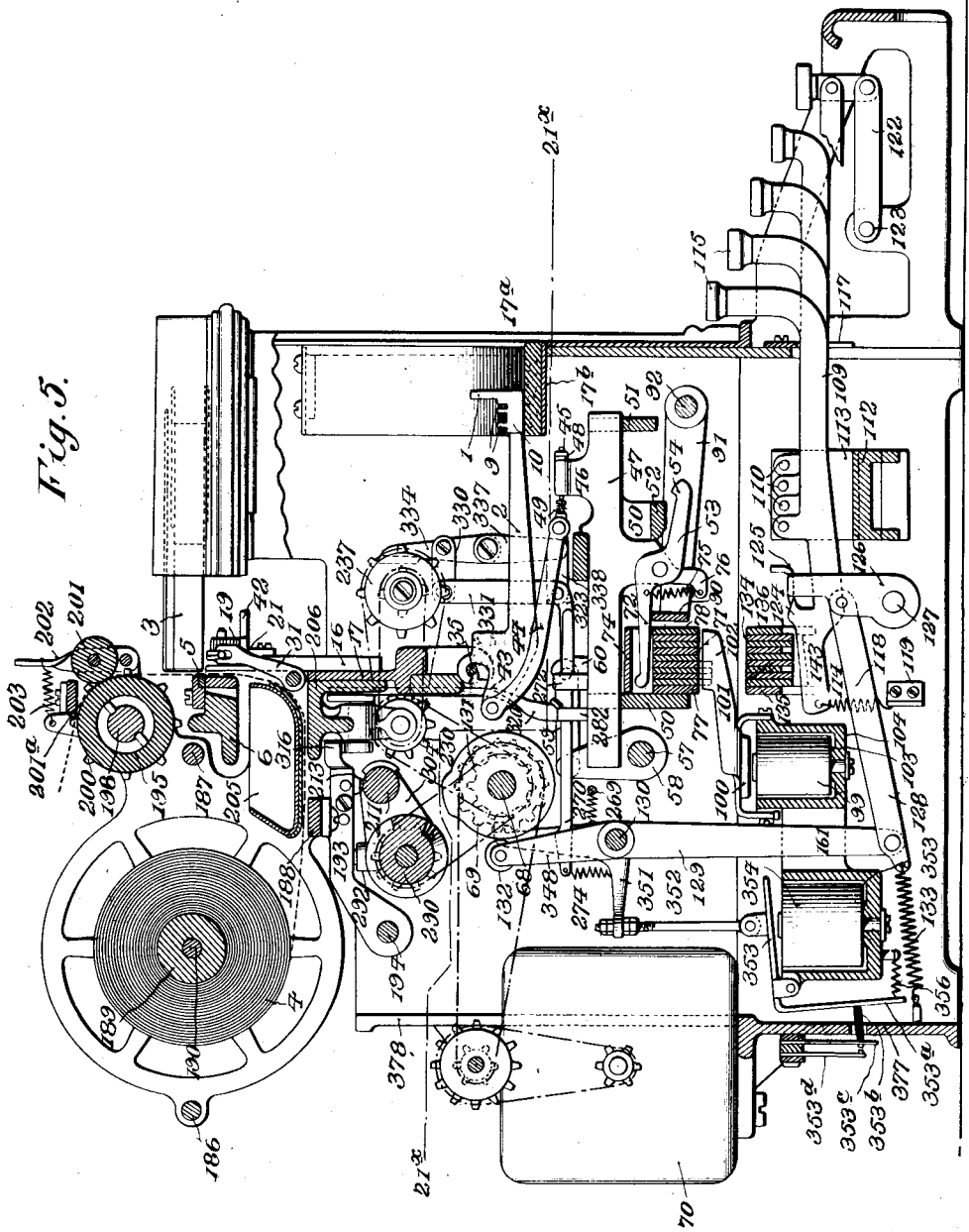
WITNESSES:
E. G. Marshall
INVENTOR
L. M. Potts
BY
John H. Holt
his ATTORNEY

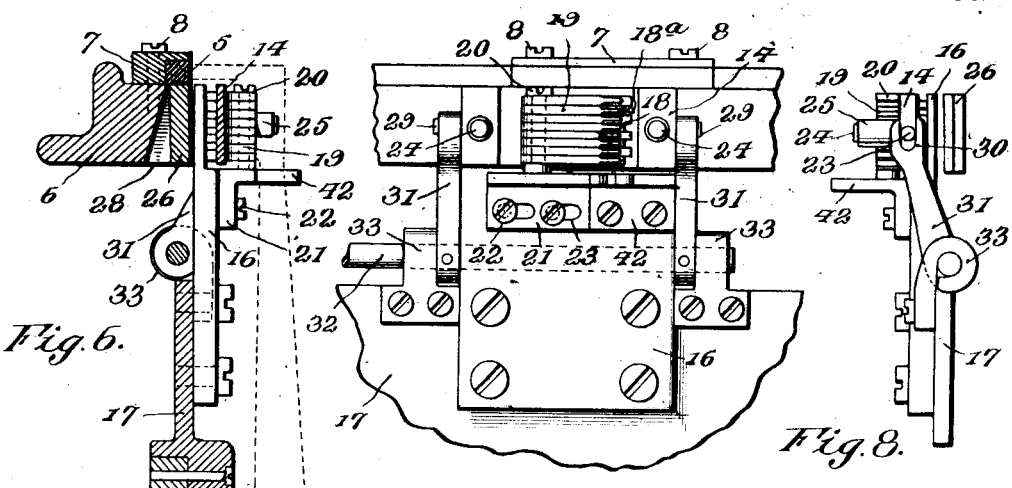

L. M. POTTS.
TELEGRAPHY.
APPLICATION FILED MAR. 6, 1911.

1,105,922.

Patented Aug. 4, 1914.
20 SHEETS—SHEET 6.

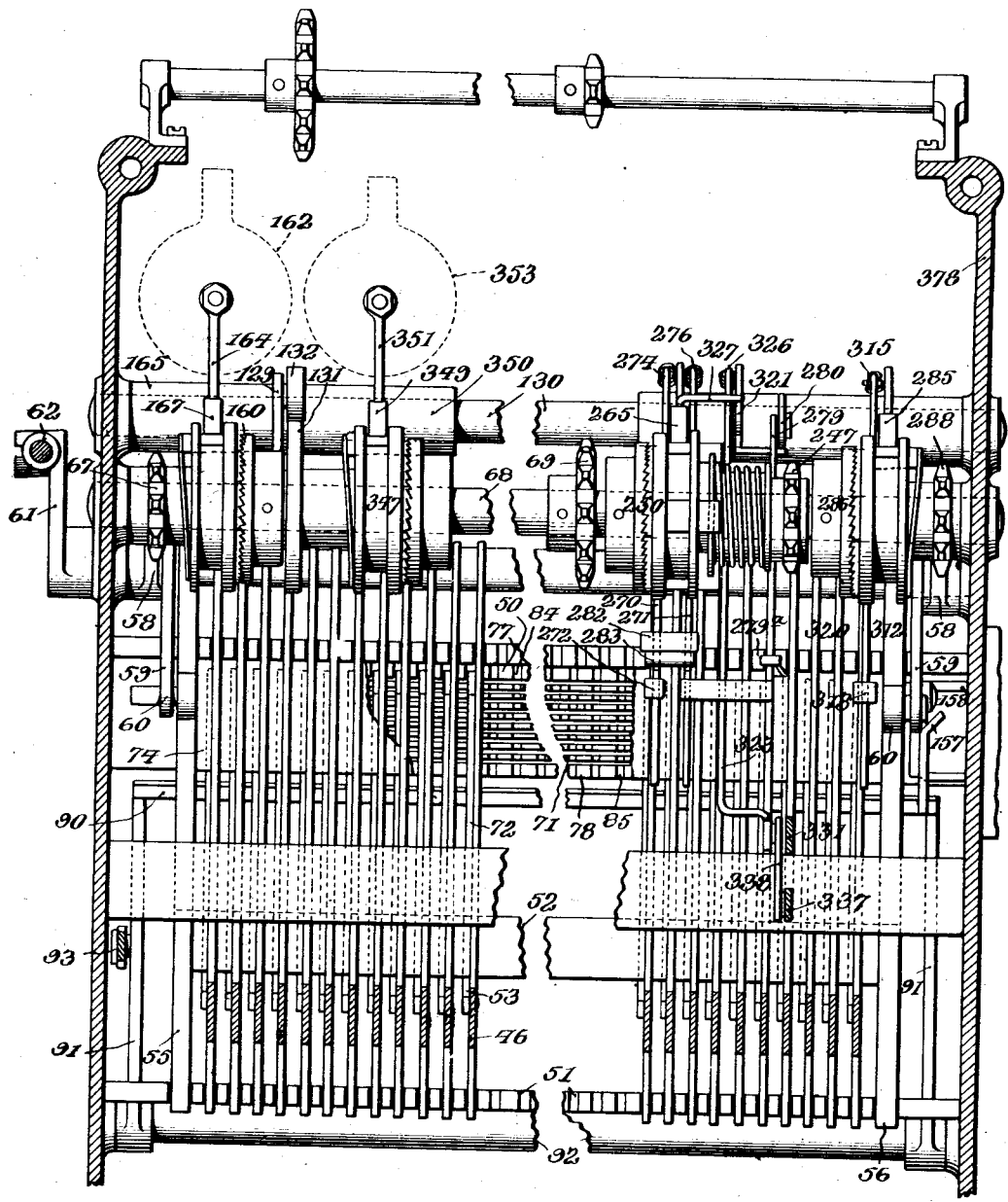

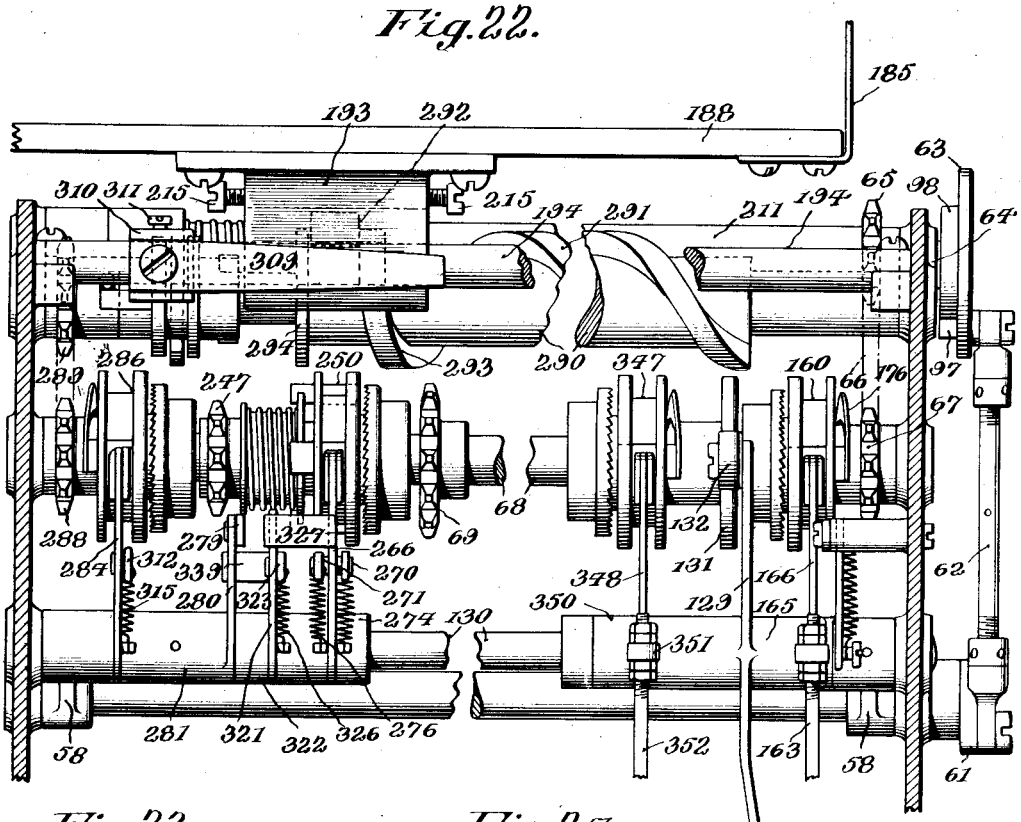
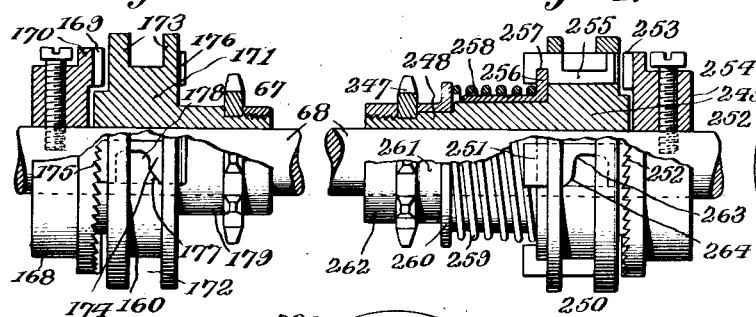
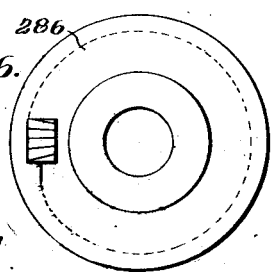

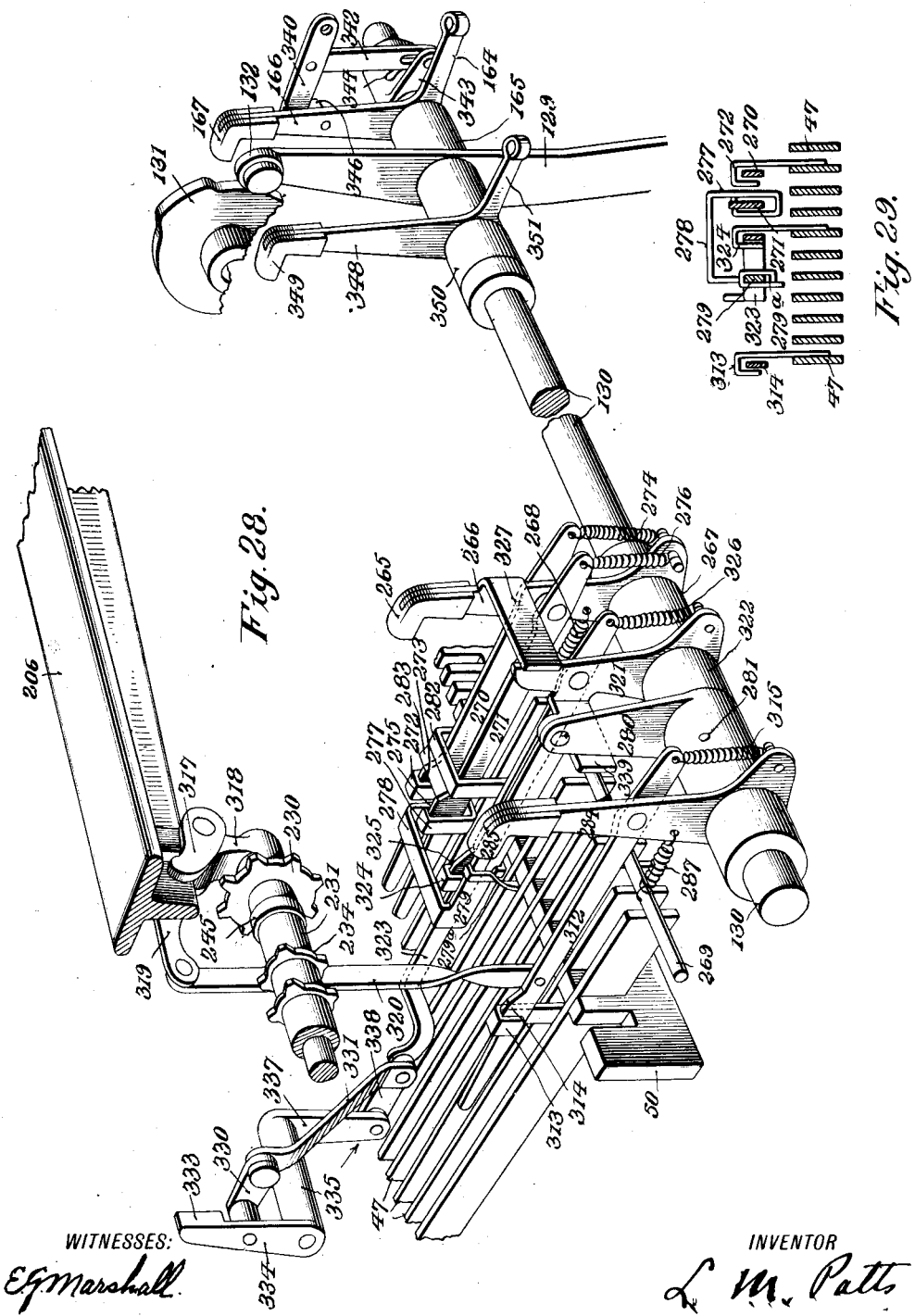

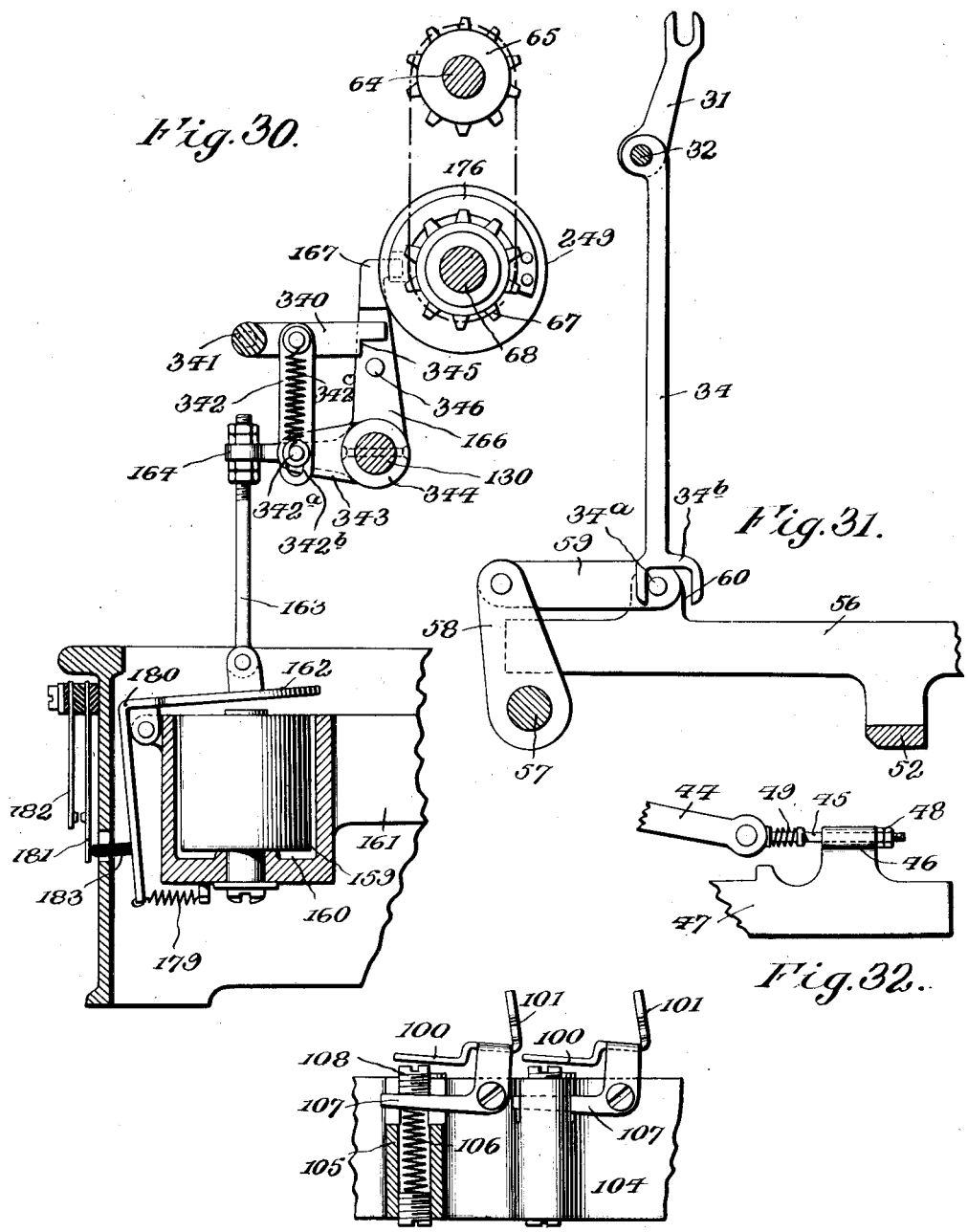

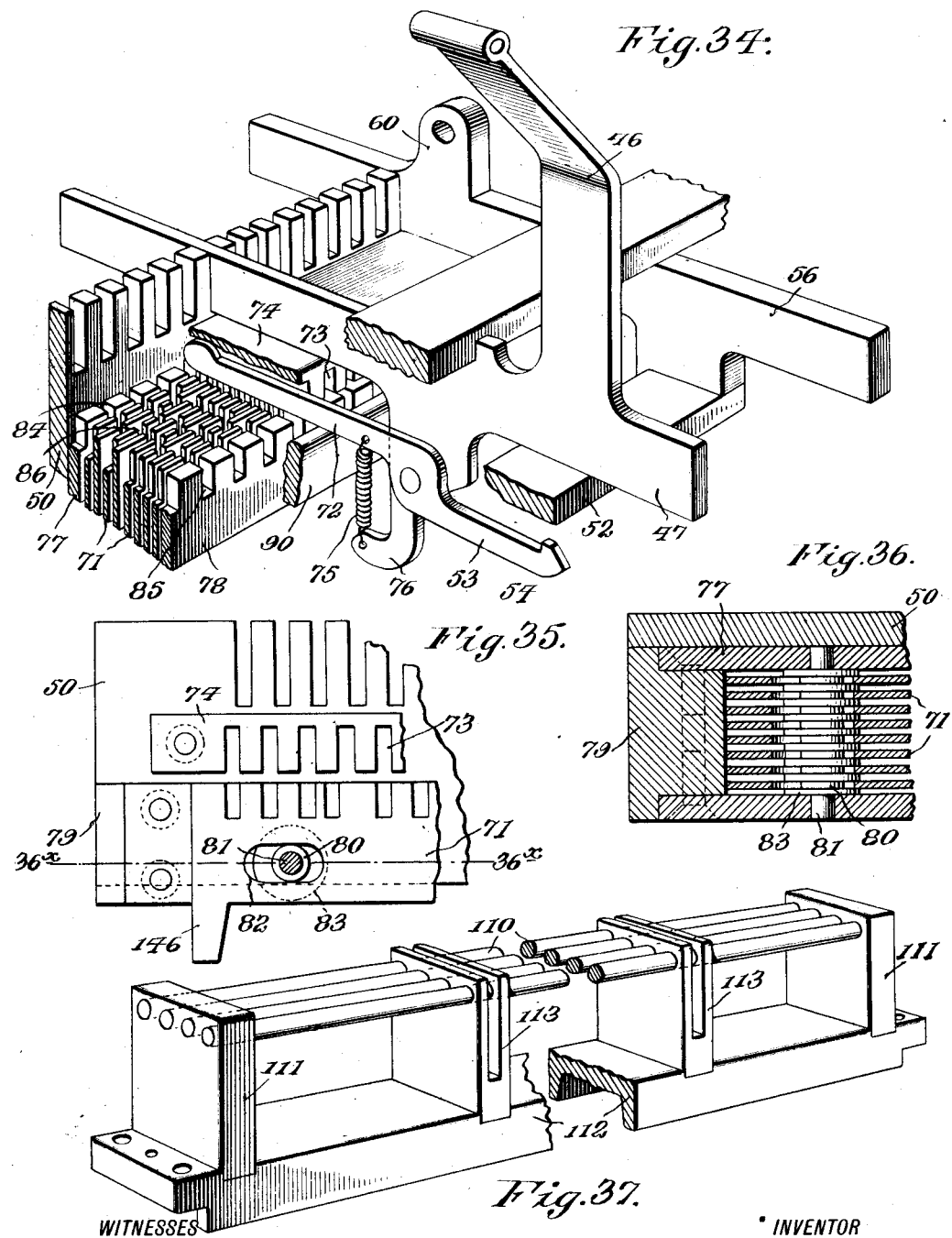

L. M. POTTS.
TELEGRAPHY.
APPLICATION FILED MAR. 6, 1911.

1,105,922.

Patented Aug. 4, 1914.
20 SHEETS—SHEET 12.

WITNESSES:
E. G. Marshall
Helzell H. Murray

INVENTOR
L. M. Potts
BY
John H. Holt
his ATTORNEY

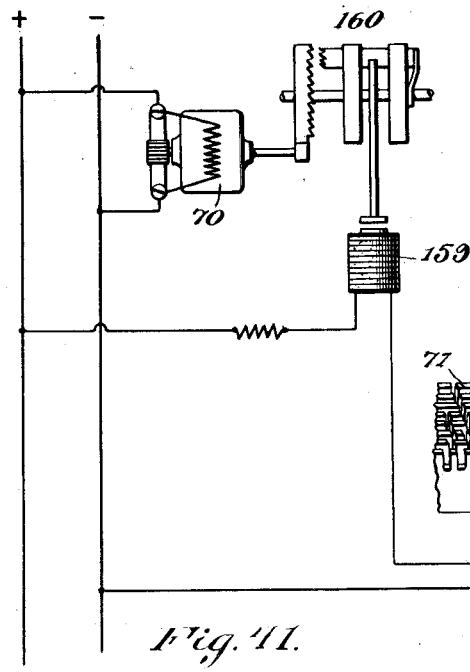
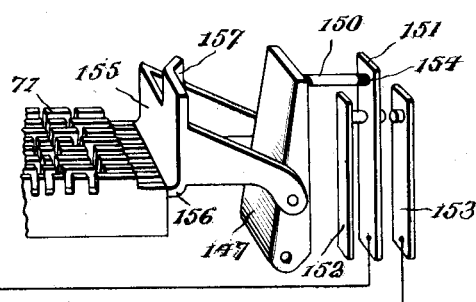
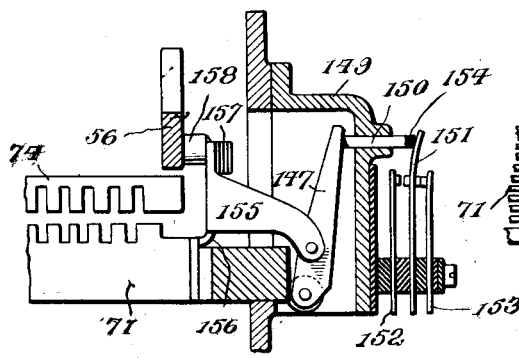
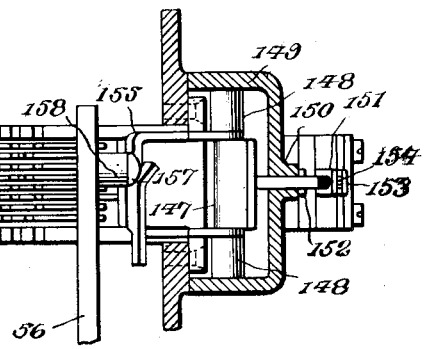
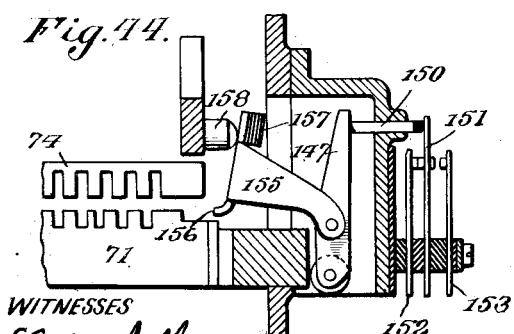
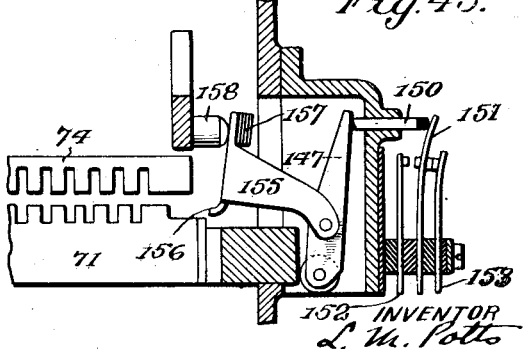

L. M. POTTS.
TELEGRAPHY.
APPLICATION FILED MAR. 6, 1911.
1,105,922.
Patented Aug. 4, 1914.
20 SHEETS—SHEET 14.
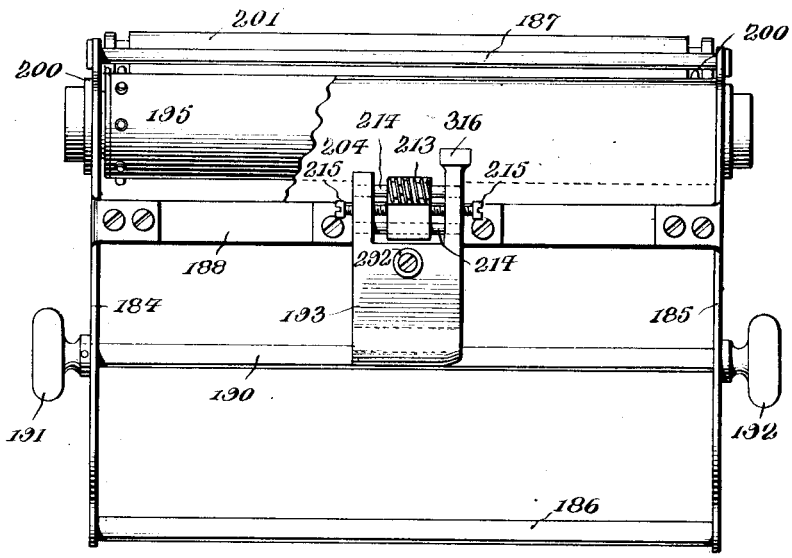
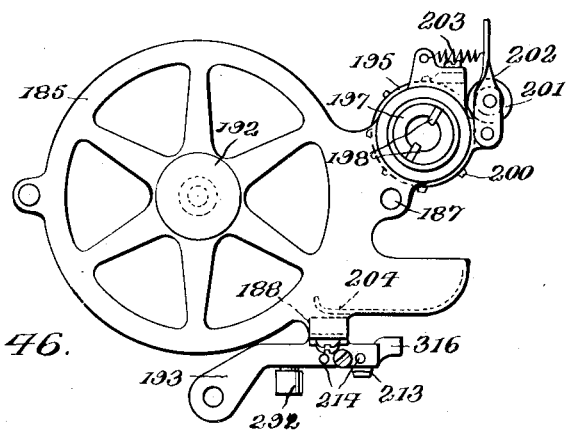
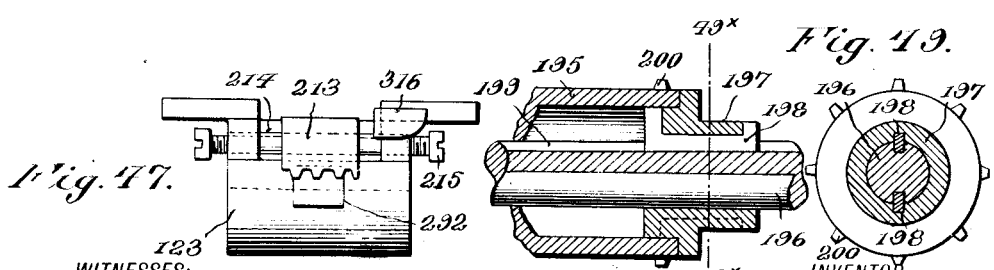

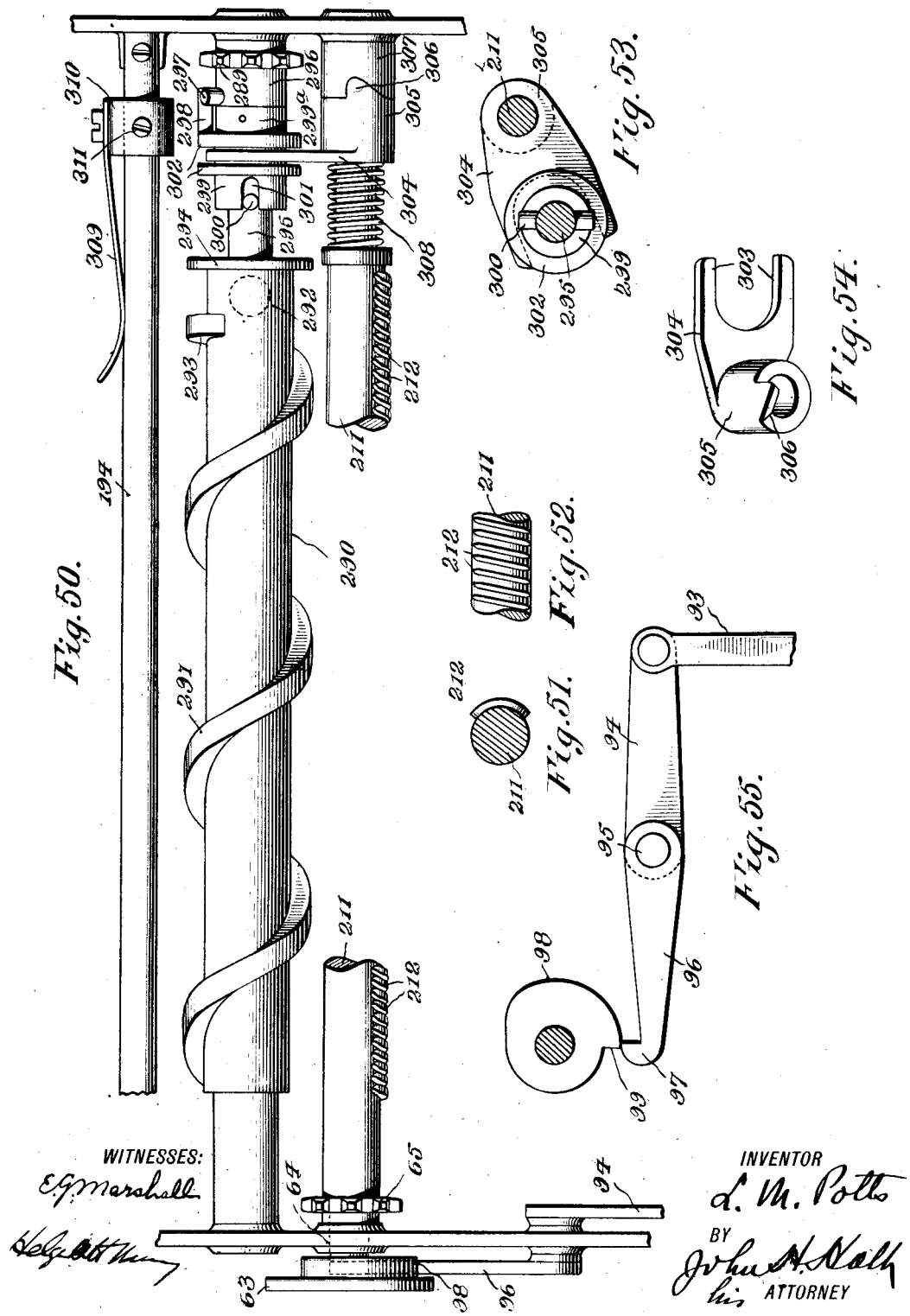

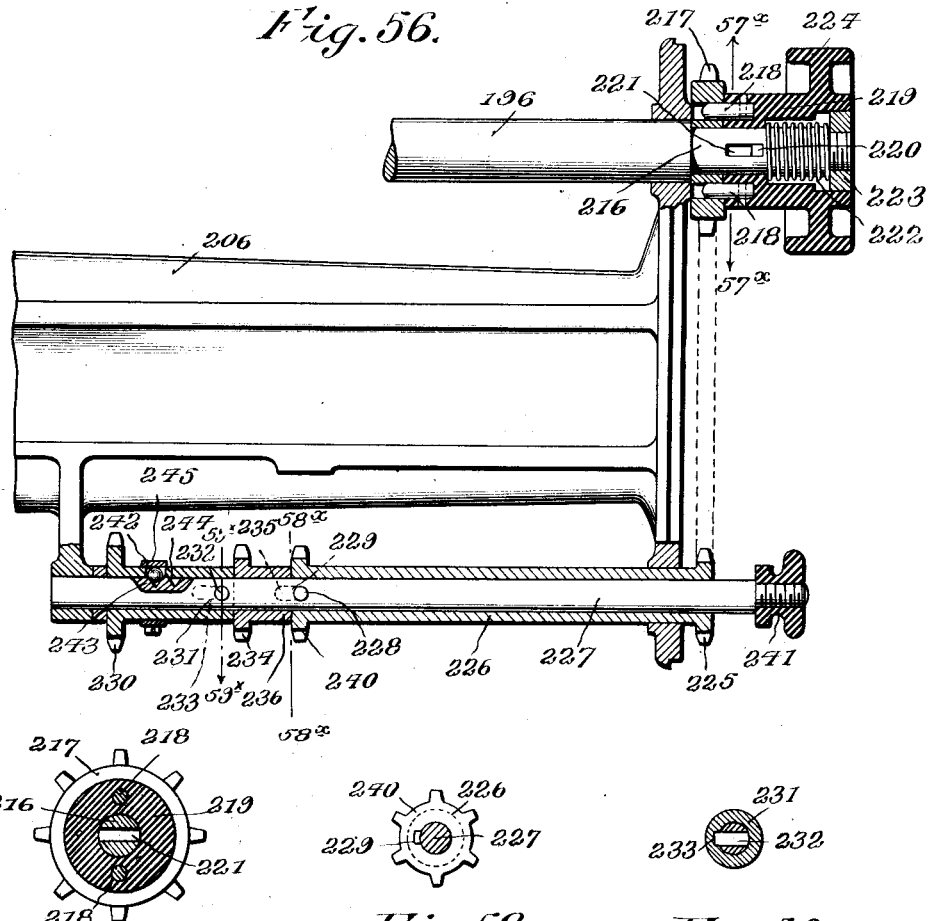

L. M. POTTS.
TELEGRAPHY.
APPLICATION FILED MAR. 6, 1911.

1,105,922.

Patented Aug. 4, 1914.
20 SHEETS—SHEET 17.

WITNESSES
E. G. Marshall
Helgett, Murray

INVENTOR
L. M. Potts
BY
John H. Holt
his ATTORNEY

L. M. POTTS.
TELEGRAPHY.
APPLICATION FILED MAR. 6, 1911.
1,105,922.
Patented Aug. 4, 1914.
20 SHEETS—SHEET 18.
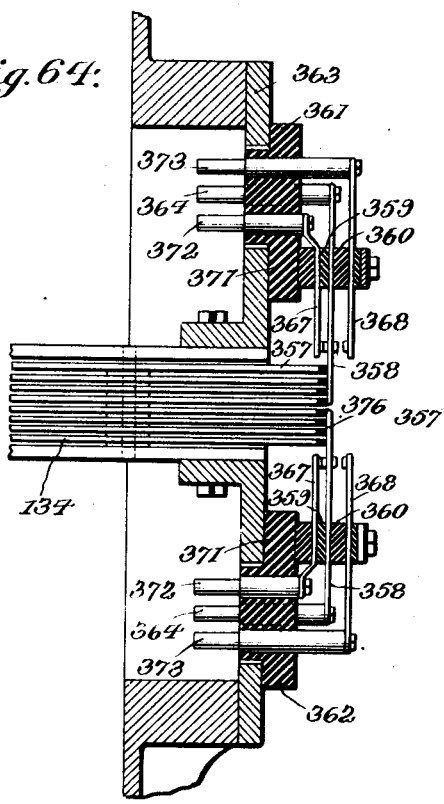
Fig. 64.
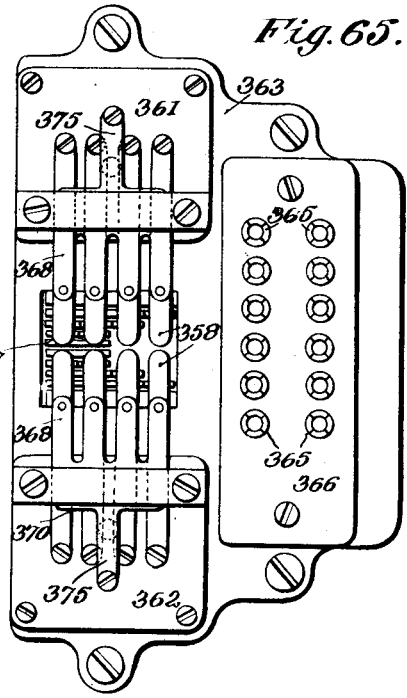
Fig. 65.
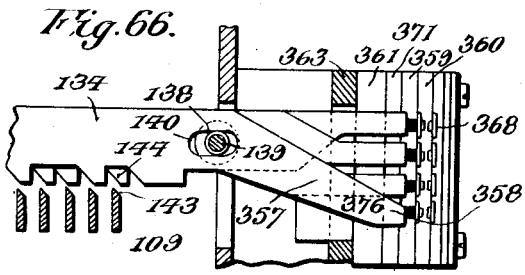
Fig. 66.
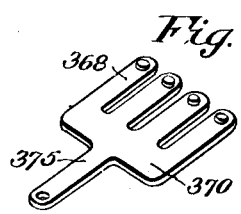
Fig. 67.
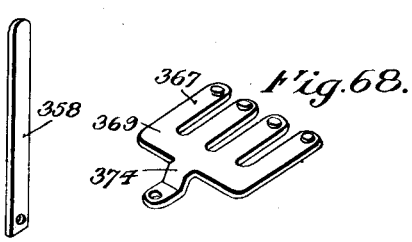
Fig. 68.
Fig. 69.
WITNESSES:
E. G. Marshall
Helge O. F. Munay
INVENTOR
L. M. Potts
BY
John N. Hall
ATTORNEY

L. M. POTTS.
TELEGRAPHY.
APPLICATION FILED MAR. 6, 1911.

1,105,922.

Patented Aug. 4, 1914.
20 SHEETS—SHEET 20.

WITNESSES:

INVENTOR
L. M. Potts
BY
ATTORNEY

UNITED STATES PATENT OFFICE.

LOUIS MAXWELL POTTS, OF BALTIMORE, MARYLAND, ASSIGNOR, BY MESNE ASSIGNMENTS, TO AUSTIN McLANAHAN, OF BALTIMORE, MARYLAND.

TELEGRAPHY.

1,105,922.　　　　Specification of Letters Patent.　　Patented Aug. 4, 1914.

Original application filed June 17, 1909, Serial No. 502,785. Divided and this application filed March 6, 1911. Serial No. 612,577.

*To all whom it may concern:*

Be it known that I, LOUIS MAXWELL POTTS, a citizen of the United States, residing at the city of Baltimore, State of Maryland, have invented certain new and useful Improvements in Telegraphy, of which the following is a specification.

The present invention was originally embodied in an application for Letters Patent of the United States, for improvements in telegraphy, filed by me June 17, 1909, Serial No. 502,785, of which application the present one is a division.

One of the objects of the system forming the subject of said original application was to provide for great flexibility, and, among other features, this system included a single machine which could perform a variety of different functions. Such machine could be used alone as a telegraphic receiver for messages transmitted from a distant point, or as a combined manual transmitter and home recorder, or as a manually operated recording machine, or as simply a manual transmitter. The record produced by such a machine could be either a printed record, a perforated record, or a combined printed and perforated record, the perforations being designed to control the automatic transmission of messages as contemplated by said system.

The present invention has to do with this machine in so far as it relates to manual transmission and in so far as it constitutes a combined receiver and manual transmitter.
It should be understood, however, that while this machine was designed primarily to form an element or unit in a certain proposed general system of telegraphy, the invention herein claimed is not to be considered in any sense as limited to such system.

My present invention has to do also with certain other features relating to manual telegraphic transmission, all of which will be more readily understood from the following description.

In order that my said invention may be better understood, I shall now describe in detail a specific embodiment thereof with reference to the accompanying drawings, and later point out the novel features in the claims.

Figure 38:
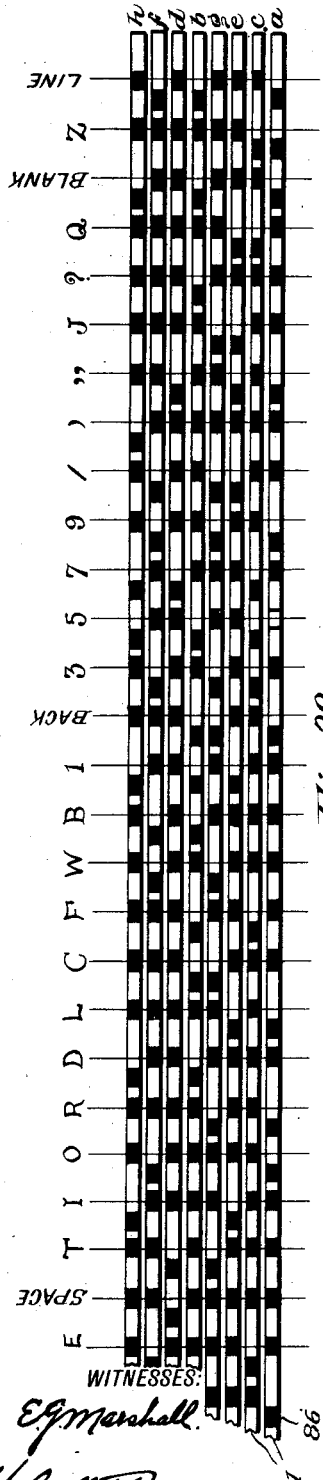
Figure 39:
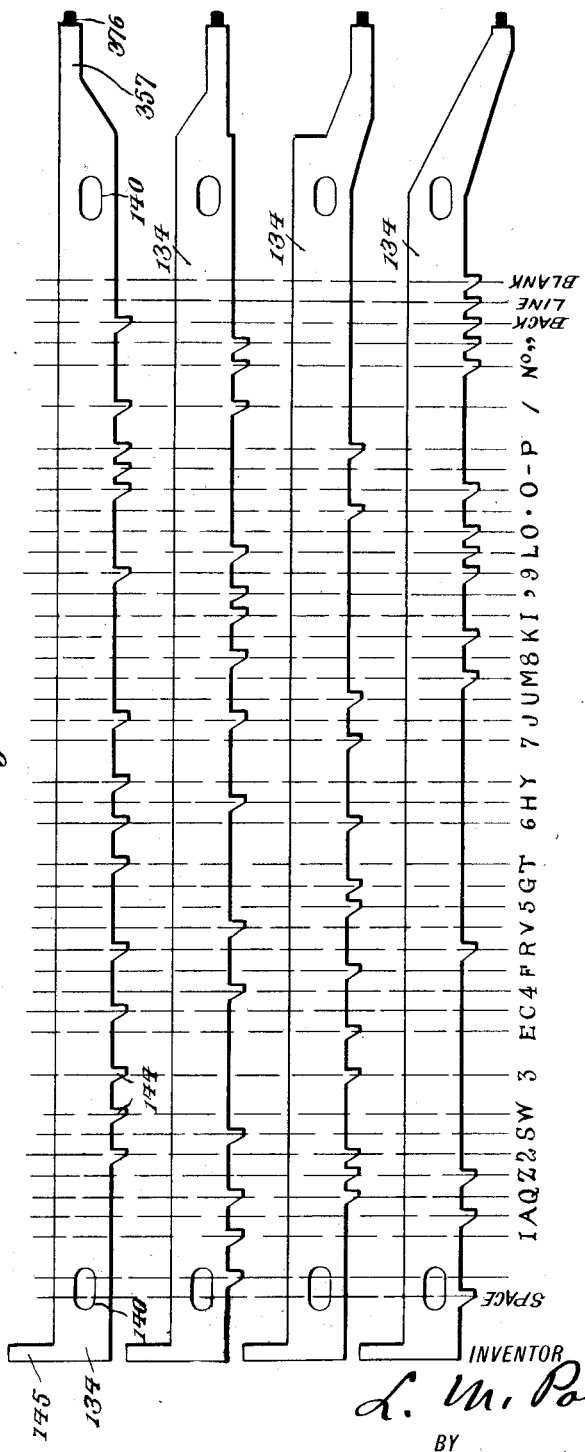
Figure 61:
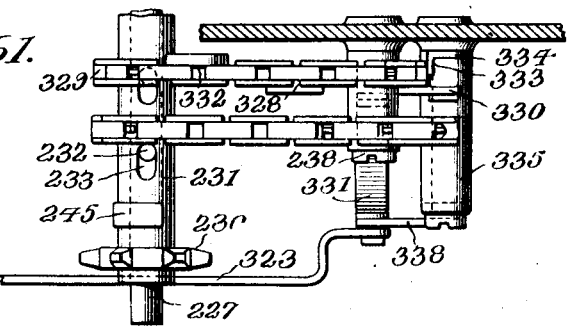
Figure 62:
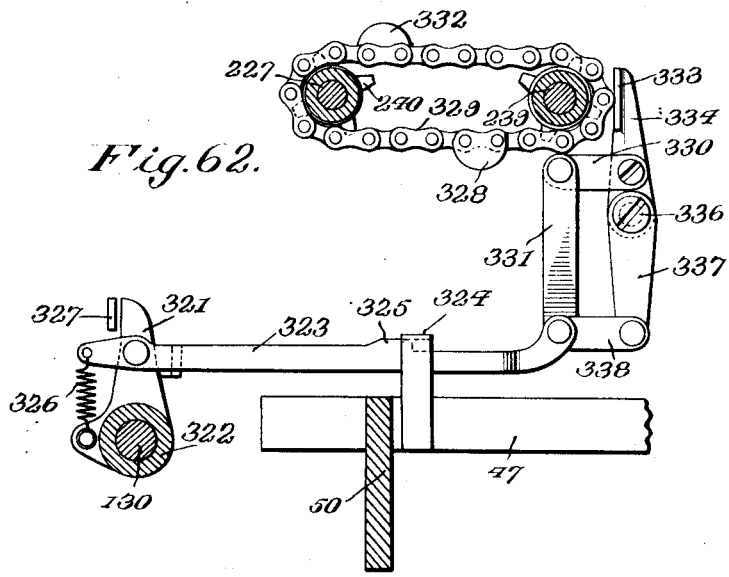
Figure 63:
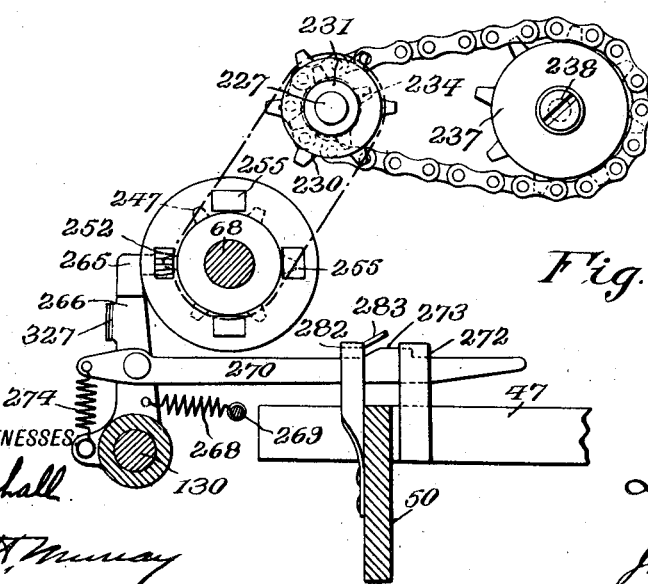
Figure 70:
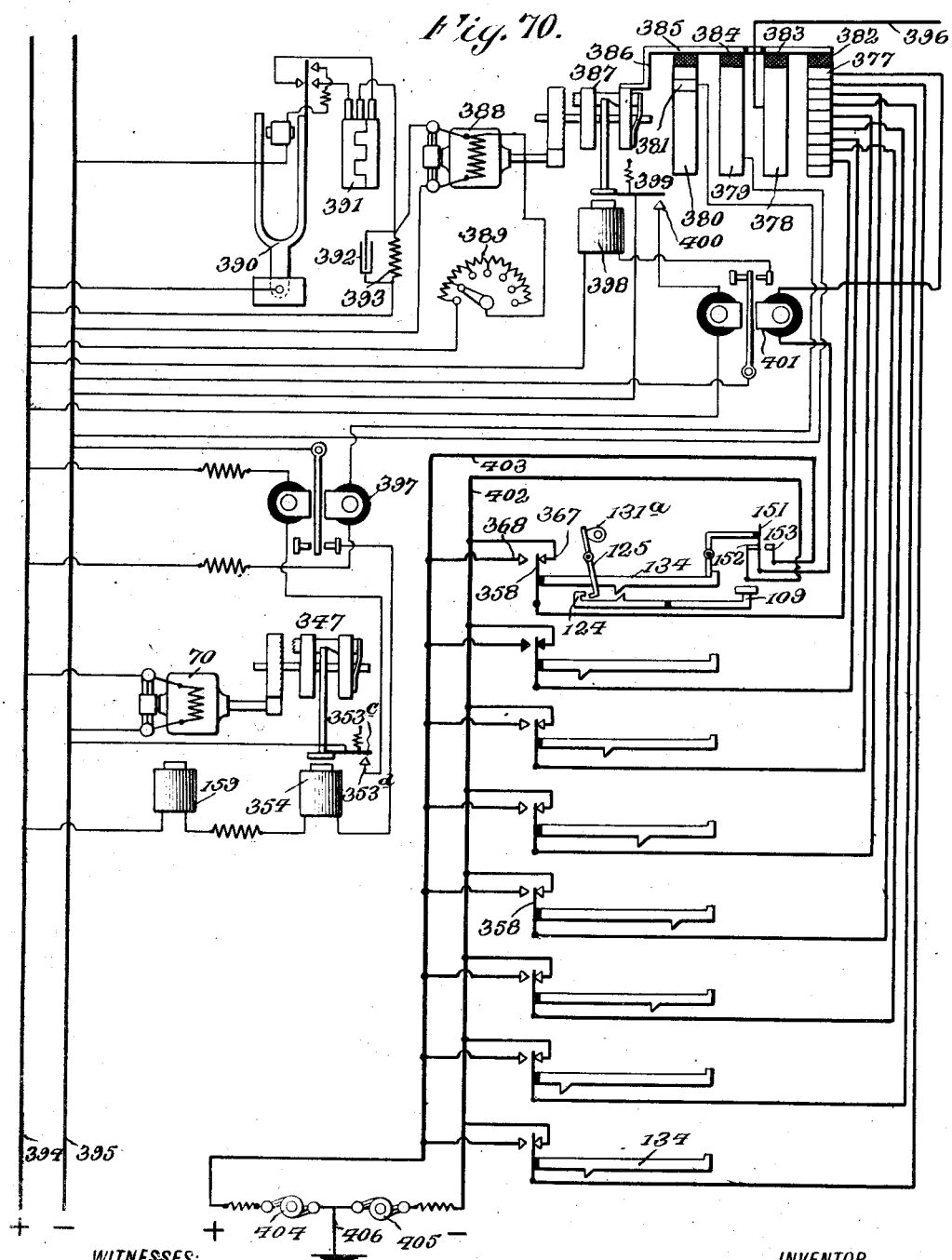
Figure 71:
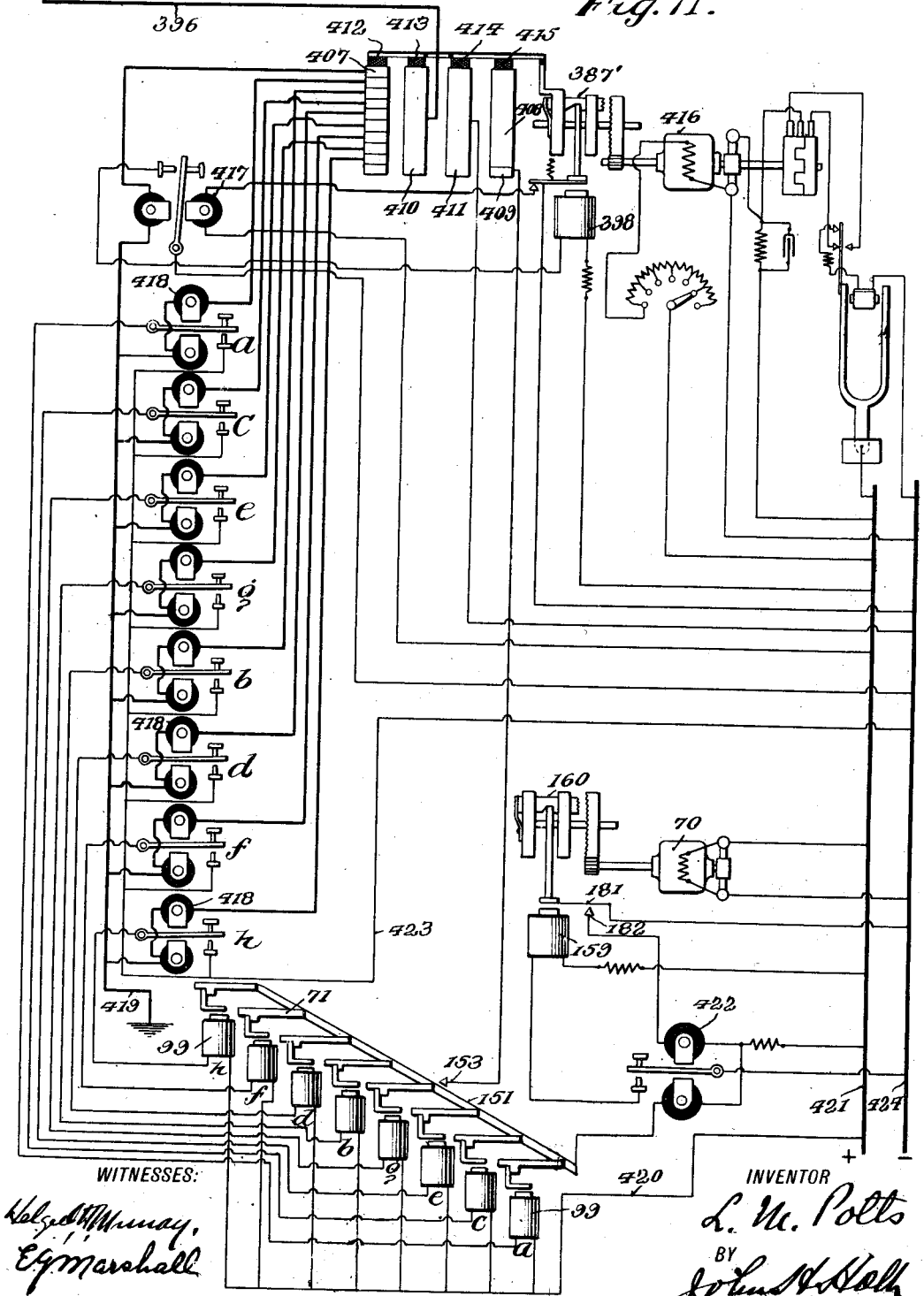

In the accompanying drawings: Figure 1, is a face view of a printed and perforated telegraph blank prepared by the machine herein described; Fig. 2, a diagram showing the system of combinations employed in said machine; Fig. 3, a front view partly in section and partly in elevation of a combined printer, perforator and keyboard transmitter embodying my present invention by which telegrams of the kind shown in Fig. 1. may be prepared. In this view many of the parts are omitted for the sake of clearness; Fig. 4, a side elevation of the machine shown in Fig. 3; Fig. 5, a side elevation partly in vertical section of said machine; Figs. 6 to 19, inclusive, details of the punching mechanism of said machine; Fig. 20, a top plan view of the lower portion of said machine showing those parts located in the bottom of the machine with the upper frame portion of the machine removed; Fig. 21, a top plan view partly in section on line $21^x$—$21^x$, Fig. 5, showing the various operating clutches of said machine, the combination bars and related parts; Fig. 22, a back view of said clutches and connected parts, showing also the backing screw, a portion of the printer carriage, and other related parts; Fig. 23, a detail side elevation partly in section, of the spacing clutch; Fig. 24, a similar view of the lining clutch; Fig. 25, an end view of the normally stationary member of the lining clutch; Fig. 26, a similar view of the backing clutch; Fig. 27, a detail perspective view of the clutch pin of the spacing and other clutches; Fig. 28, a perspective view of some of the mechanism which operates with the said clutches to effect the operations of "spacing," "lining," "backing" and "blanking"; Fig. 29, a detail cross section through some of the sliding bars shown in Fig. 28, showing the relative positions of the loops carried by said bars and the arms with which they coöperate; Fig. 30, a fragmentary detail view partly in elevation and partly in section of the spacing clutch, and its operating magnet showing the connection between the two, and showing also the connection between the spacing clutch and the spacing screw shaft; Fig. 31, a fragmentary detail view partly in section and partly in elevation of the actuating bar mechanism showing the connection between this mechanism and the rocking shaft of the stripper plate of the punching mechanism; Fig. 32.

a fragmentary detail view showing the connection between one of the links of the striker bars and the sliding bar which operates said striker bar; Fig. 33, a fragmentary detail view, partly in section and partly in elevation of the back of the magnet supporting frame with magnet armatures mounted thereon showing the spring arrangement for returning said armatures to their normal positions after operation; Fig. 34, an enlarged fragmentary perspective view of the combination bars together with a sliding bar and latch mechanism and related parts which coöperate with said combination bars; Fig. 35, an enlarged detail fragmentary elevation to illustrate the manner of supporting said combination bars; Fig. 36, a section on line 36×—36×, Fig. 35; Fig. 37, an enlarged detail perspective view showing the supporting frame and rods for the key levers; Fig. 38, a diagrammatic view showing the arrangement of slots in the combination bars; Fig. 39, a semi-diagrammatic view showing the arrangement of lugs on the actuating bars; Fig. 40, a diagram showing an arrangement of the circuit of the spacing magnet, and controlling contact device therefor; Figs. 41 to 44, inclusive, detail views of said contact controlling device showing various steps in its operation; Fig. 45, a bottom plan view of the paper carriage removed from the machine; Fig. 46, an end elevation of said carriage; Fig. 47, a front elevation of the bracket of said carriage which carries the spacing screw nut and the backing roller; Fig. 48, a fragmentary horizontal section of one end of the paper feed roller of said carriage, showing the lining shaft screw partly in section and partly in elevation; Fig. 49, a section taken on line 49×—49×, Fig. 48, looking to the left; Figs. 50 to 54, inclusive, details of the spacing and backing screws and some of their coöperating parts; Fig. 55, a detail side elevation showing the relation between the lifting bar lever mechanism, and the cam which operates the same; Fig. 56, a detail view showing partly in section and partly in elevation the arrangement of gears for transmitting motion to the lining shaft, and the mechanism on the end of said shaft for rotating the same independently of the power mechanism; Fig. 57, a section on line 57×—57×, Fig. 56 looking to the left; Fig. 58, a section on line 58×—58×, Fig. 56; Fig. 59, a section on line 59×—59×, Fig. 56; Fig. 60, a detail semi-diagrammatic view to show the arrangement of the successive telegraph blanks on a continuous roll of paper; Fig. 61, a fragmentary detail top plan view to illustrate principally the arrangement of the cams for operating the blanking mechanism; Fig. 62, a detail view partly in side elevation and partly in section to further illustrate the mechanism whereby the said cams operate the blanking mechanism; Fig. 63, a detail view partly in section and partly in elevation to show the connection between the lining clutch and the shafts which carry said cam mechanism; Figs. 64 to 69, inclusive, detail views of the contact mechanism operated by the selector bars; Fig. 70, a diagram of the circuits and apparatus at the transmitting end of a simplex line employing this improved system of line operation in which the manual keyboard transmitting mechanism is employed; Fig. 71, a diagram of the circuit connections and apparatus at the receiving end of the line of Fig. 70.

The machine shown in Figs. 3 to 63 inclusive, comprises in one unit a recording machine which may be operated locally from a keyboard forming a part of the machine, or electrically from a distance, and when so operated may record the intelligence in either printed or perforated form or both. In addition, the said machine embodies electrical transmitting mechanism controlled by the keyboard for controlling the operation of another machine; and when this keyboard transmitting mechanism is operated the recording mechanism of that machine may also operate, thus producing a home record of the matter transmitted. I thus have embodied in one machine or single unit, the functions of several machines, and while my invention in its broader aspect is not limited to the embodying of all these functions in one machine, still the practical utility of such a machine in telegraphy is manifest.

The punching mechanism of this machine was provided for the purpose of perforating blanks, such for example as shown in Fig. 1, for controlling automatic telegraph transmitters. The machine regarded as a perforating or punching machine constitutes the subject of a copending U. S. application filed by me for improvements in perforating machines and, therefore, no claim is herein made for the punching mechanism *per se*. This mechanism, however, will later be described, since it must be understood that I do not confine or limit my present invention, considered in its broader aspect, to any particular form of record. For example, this record may be a typewritten record only, or it may be a perforated or similar record, or combined perforated and typewritten, or other form of record.

I shall now describe in detail the construction of one of these machines, and later show how one may be operated from another electrically.

The printing in this machine is effected by sending type 1, carried by pivoted bars 2 into engagement with a suitable inked ribbon 3, which passes in front of the paper 4, upon which the printing is done. This paper in turn passes in front of a suitable platen 5, which may consist of a piece of rawhide or other suitable material clamped rigidly to the cross frame 6 of the machine by a flanged plate 7, held rigidly against said frame by means of screws 8.

No particular form of ribbon or ribbon-feeding mechanism is claimed as a part of this invention, and as such mechanisms are well known it is unnecessary here to go into a detailed description of this feature.

The punching mechanism of this machine, as hereinbefore pointed out is for the purpose of preparing blanks for controlling the operation of automatic transmitters, such for example as shown in Fig. 1. In these blanks each signal is represented by a certain code arrangement of perforations. For example, the letter "A" is represented by two perforations occupying certain relative positions; the letter "B" by two other perforations occupying different relative positions from the first two, and so on. These perforations are produced in the present machine by causing lugs 9 on the type heads 10 of the striker bars to drive punching pins through the material of the blank, and the selection of the particular punches or functions to be operated for a given signal is determined by the lugs on the striker head corresponding to that signal. For example, the striker bar for the letter "A" has two lugs so disposed as to operate corresponding punches; the striker bar for another signal would have a different combination of lugs adapted to operate a different combination of punches from those for the letter "A", and so on; each striker head being provided with one or more lugs arranged in such positions as to operate a different one or combination of punches for each signal. The system of combinations over which these code perforations are based is clearly shown in the diagram Fig. 2, and it is thought that this system or code had best be described before proceeding further, since its explanation will make clearer the construction and operation of certain selecting and combination mechanism to follow.

Referring to Fig. 2, let the line of characters and other signals extending horizontally across the top of the diagram represent the various transmittable characters and other signals. For all of these characters and the other signals indicated, there are eight code positions, indicated on the left in the diagram (Fig. 2) by the vertical zigzag row of eight round dots. These positions passing from the top to the bottom of the vertical row referred to, shall be called the $a$, $b$, $c$, $d$, $e$, $f$, $g$, and $h$ positions, respectively. Each of such code positions is determined by the vertical distance from each end of the row and by the horizontal position on either side of an imaginary line indicated by the dotted line $x$—$y$, passing vertically through said zigzag row. Each code character or signal is formed by one or more perforations occupying a different one or combination of such positions. For example, for the letter "A" the perforations occupy the $a$ and $d$ positions; for "B", the $h$ and $f$ positions; for the letter "C", the $b$ and $g$ positions, and so on through the alphabet. The numerals, "back", "line", "blank" and four other miscellaneous signals are, in the case shown, formed each by the combination of three positions. For example, the code numeral 1 is formed by perforations in the $b$, $e$ and $h$ positions; the "back" signal, which will be more readily understood later, is formed by perforations in $a$, $b$ and $g$ positions, and the dollar mark by the $d$, $e$ and $f$ positions. The punctuation marks and "space" signal occupy but one code position each.

The punching pins hereinbefore referred to comprise each a preferably cylindrical shank portion 11, the shearing end of which is serrated, as at 12, to more readily cut the paper. (See Figs. 6–19 for details of the punching mechanism). The shanks of these pins pass through and are longitudinally slidable in holes 13 in a stripper plate 14, and in corresponding holes 15, in the upper end of a plate 16, screwed or otherwise made fast to the front plate 17 of the machine. These pins in the present machine are eight in number, staggered as shown so as to occupy a small space vertically. The positions occupied by these pins correspond to the code position of the eight round dots forming the zig-zag row at the left hand end of Fig. 2. Each of these pins is provided with an elongated head 18. The heads of these punching pins are prevented from turning by a small pin located as indicated at 18ª, Fig. 7. Resting respectively upon these heads, are a series of eight anvils 19, pivoted upon stud 20 screwed into a plate 21 secured to plate 16 by screws 22 passing through slots 23 in plate 21. These anvils are so arranged that their heads resting upon the heads of the punching pins, are adapted to be struck by the combination lugs 9, on the striker bar heads, and thus act to force the punching pins through the paper. Immediately after the said pins have been forced through the paper, they are drawn back therefrom by means of the stripper plate 14, which at that time moves away from the paper, and, engaging the heads of these pins which have been operated, carries them out of engagement with the paper. This stripper plate is slidably mounted on two forwardly extending pins 24, carried by the plate 16, the said stripper plate being for this purpose provided with guide sleeves 25, which slide on said pins. A shearing plate 26 is located just in the rear of the row of holes through which the punching pins pass in the plate 16, and is provided with a similar arrangement of holes 27, adapted to register with the shearing ends of the punching pins. This shearing plate is made fast to the frame 6 of the machine in any suitable way, the frame of the machine being cut away, as at 28 to allow the punchings to fall into a pan or other suitable receptacle hereinafter more particularly referred to. The necessary motion is imparted to the stripper plate through trunnions 29 at its ends, which engage in vertical slots 30 in the upper ends of lever arms 31, made fast to a rock shaft 32, journaled near one end in brackets 33 made fast to the front plate 17 and at its other end in the frame of the machine (see Fig. 3). This shaft 32 is actuated through a lever 34, connected to certain power mechanism, which will be hereinafter more particularly described, through a pin 34$^a$ working in a forked end 34$^b$ of arm 34, there being considerable lost motion between said fork and pin, thereby imparting but slight movement to arm 31 as compared with the movement of pin 34$^a$. (See Fig. 31). In this punching mechanism no springs are required to return the punches to their normal positions, and, therefore, when these punches are driven forward into the paper there is no resistance to be overcome, other than the friction of the pins and the resistance of the paper.

In some uses of the machine it is desired to print without perforating. This change may be effected in the present mechanism by a very simple adjustment. By loosening the screws 22, and sliding the block 21 to the left, (Fig. 7), the anvils may be withdrawn from the path of the perforating lugs 9, on the striker bar heads, so that when a given striker bar is operated its type will be sent against the ribbon, but the lugs 9 will be rendered non-operative. The anvils are shown in this position in Fig. 12.

The striker bars 2 are, in the machine shown, supported in a semicircle upon a common fulcrum, consisting of a wire 35 sprung into a recess or groove 36 in the semicircular front plate 17 of the frame of the machine, the said striker bars being supported upon said wire by means of bearing lugs 37. Each striker bar moves in an individual guide slot 38 in the front plate 17. In the drawings all but one or two of the striker bars are omitted for the sake of clearness. These striker bars are all held in position on fulcrum wire 35 by means of a segmental plate 39 bolted to the plate 17 and provided with a rounded cut portion 40 to fit the radius of the supporting lugs 37 of the key levers. By removing one or more segment plates 39 at a time, the striker bars held by these sections may be removed without disturbing the others.

In the position of rest the heads of the striker bars lie on a pad 17$^a$ supported by a semicircular plate 17$^b$ secured to the machine frame as shown most clearly in Fig. 3. These striker bars are suitably spaced and bent, as is well known in typewriter construction, so that they will be driven to a common center, the type head of each bar passing to the striking point through a guide slot 41 in guide plate 42, located just below the row of punching pins and made fast to the plate 16.

Each striker has a rear extension or short lever arm 43, each of which extensions is pivotally connected to one end of an individual link 44 and each of these links is pivotally connected at its other end to an individual pin 45. Each of these pins is longitudinally slidable in a separate lug 46 of a series of sliding bars 47, there being one such sliding bar for each such striker bar, and one such lug on each sliding bar. The movement of pin 45 in its lug 46 is limited in one direction by nuts 48. On the side of lug 46 opposite nuts 48, the pin 45 carries a coil spring buffer 49 (see Figs. 5 and 32).

A given striker bar is sent into the striking or operating position indicated in dotted line in Fig. 6, by the forward (left to right in Fig. 5) movement of its individual sliding bar 47 causing its lug 46 to engage nuts 49, thereby imparting longitudinal movement to pin 45 which, pulling through link 44, acts on short arm 43 to turn the striker bar on its fulcrum 35. A small amount of lost motion is allowed between spring 49 and lug 46 to allow the striker bar 2 to travel ahead of the motion of sliding bar 47 in order to give a sharp blow. The lugs 46 uniformly increase in length as their distance increases from the center of the machine so that their heads lie in the arc of a circle, as most clearly shown on the left in Fig. 3. The sliding bars 47 are mounted in guide slots in bars 50 and 51, which extend transversely across the machine and are made fast to the side frames thereof. The sliding bars 47 receive their motion from an actuating bar 52, which is at times positively connected to the individual sliding bars 47, by means of latches 53, one of which is pivoted on each of said sliding bars. The operative connection between the said latches and bar is formed by the latter engaging shoulder 54 on the heads of the individual latches (see Figs. 5 and 34). The actuating bar 52 is supported at its ends on bars 55 and 56, which are slidably mounted in plates 50 and 51 for movement back and forth in the machine. Such movement is imparted to said bars from a rock shaft 57, acting through crank arms 58 and links 59 connected to lugs 60 on the respective bars 55 and 56 (see Figs. 5 and 21). Rocking motion is imparted to said shaft 57 through crank arm 61, located on the end of said shaft outside the machine (see Figs. 4, 21 and 22), and connected by rod 62 to a crank disk 63, made fast to a spindle 64 formed on one end of the spacing screw hereinafter described. The shaft 64 receives its motion through sprocket gearing 65, 66, 67 (see Fig. 22), from a clutch hereinafter described, mounted on a continuously rotating shaft 68, which is geared from sprocket 69 fast thereon through the sprocket gearing indicated, or in any other suitable way, to a small electric motor 70, mounted on the frame of the machine. Obviously, any other suitable source of power, may be employed in place of the electric motor, but such a motor is preferred.

The selection of the particular latch 53 to be engaged by the actuating bar 52, is effected by means of a series of combination bars 71, coöperating with tail pieces 72 on the several latches. These tail pieces 72 pass transversely across all of the combination bars and normally rest in guide slots 73 in a plate 74, which extends across the machine and over the tops of all the tail pieces 72 (see Fig. 34). The latch tail pieces 72 are constantly pulled toward the combination bars by individual springs 75, secured to the latches and to depending brackets 76 on the slide bars 47.

The selection of the particular latch to be operated is effected by bringing into transverse alinement, beneath the tail piece of the latch it is desired to select, a row of slots 86 in the upper edges of the combination bars, thereby permitting the particular latch tail piece above said alined slots to be pulled thereinto by spring 75. This causes the selected latch to turn on its pivot and send its latch shoulder 54 into the path of the actuating bar 52 which in its forward travel, will engage said latch and thereby become positively connected to the slide bar 47 of the striker bar which it is desired to operate.

The arrangement of the slots in the combination bars is most clearly shown in the diagram Fig. 38 which indicates enough of the length of said bars to illustrate the principle involved. For each of the a, b, c, d, e, f, g and h code positions there is a combination bar, and these are so slotted that by shifting said bars laterally in the code combinations required for the different characters or other signals, each such bar or combination of bars thus shifted causes an alinement of slots across all of the said bars. Thus, for the space signal the d bar alone would be shifted, and this would effect an alinement of slots across all the bars. For the letter (A) the a and d bars would be shifted, causing an alinement of a different combination of slots, and so on. Each combination bar is moved forward against the tension of an individual spring 87 each of which is secured at one end to a hook 88 on its combination bar, and all secured at their other ends to a bracket 89, secured to the bottom of side plates 77, 78 (see Fig. 3). These springs return the combination bars to their normal positions.

The alining of slots in bars for selective purposes is well known in the art, and I do not claim this feature broadly. The system of combinations, however, upon which these bars are slotted is new and forms an important part of this invention. These combination bars are mounted between two side plates 77 and 78, made fast at their ends to supporting brackets 79 secured to the side frames of the machine, the said bars being supported near their ends for longitudinal movement between said plates upon rollers 80 carried on a pin 81 supported in plates 77 and 78, the said rollers each passing through slots 82 in the combination bars. Between the combination bars are located spacing washers 83 (see Figs. 35 and 36). The plates 77 and 78 are provided respectively, with slots 84 and 85 registering with each other and acting as hereinafter described as guides for the tail pieces of the said latches.

The latch tail pieces 72 do not normally engage the tops of the combination bars, since they would thereby interfere with the longitudinal motion of said bars, but are held a short distance thereabove by means of a bar 90, which extends across the machine and normally engages all of said tail pieces, holding them up out of engagement with the combination bars until it is necessary for said arms to engage the slots in said bars, when said bar 90 passes downward allowing the tail pieces 72 to follow it. This releasing bar 90 is supported at its ends on arms 91 located near each side of the machine frame and made fast to rock shaft 92, extending across the machine and journaled in the side frames thereof (see Figs. 4 and 21). The required motion is imparted to this shaft through the medium of a link 93 connected at one end to one of the arms 91 and at its other end to a lever 94 made fast to a stud shaft 95 passing through the side frame of the machine and carrying at its outer end a lever 96 made fast thereon. The lever 96 has a shouldered head 97 which rests against a cam 98 made fast to the shaft 64 just outside of the frame of the machine (see Figs. 4, 50 and 55).

The manner in which the cam coöperating with the arm acts to raise the left bar will more fully appear from the description of the operation of the machine which will follow later.

For the purpose of imparting the necessary movement to the combination bars to bring their slots into proper alinement, I provide two independent means; one electrical for controlling these bars from a distance, and the other manual for controlling them locally. The parts are so organized that no disconnection or alteration in the mechanism whatever is necessary in changing from one operating means to the other. The electrical operation of the combination bars is effected in the present case by a series of eight electro-magnets 99, acting upon pivoted armatures 100, provided with arms 101, which extend across the combination bars beneath them and engage lugs 102 on their lower edges. There is but one lug 102 on each combination bar, so that each of said bars is operated by its individual magnet 99. The electromagnets are supported by being mounted each in a separate cavity 103 in an iron casting 104 which extends transversely of the machine and which is shown most clearly in Figs. 3, 5 and 20. The armatures of the magnets 99 are returned to their normal positions after operation each by an individual coil spring 105 located each in a cavity 106 in casting 104 and pressing up against an arm 107 forming an extension on each armature 100, the upward movement of arms 107 being limited by screws 108 (see Fig. 33). The manner of energizing these magnets to effect the required combinations will be described later in connection with the more purely electrical phase of my invention.

The combination bars are operated manually from a keyboard provided with certain permutation or selecting mechanism which picks out or selects and operates the proper bars. The keys of this keyboard correspond substantially in arrangement to that of a standard typewriter keyboard except that in the present case there are certain additional keys which do not appear in a standard typewriter keyboard. These will be described later.

The keyboard mechanism in the present machine comprises among other parts, a plurality of key levers 109 fulcrumed on rods 110 extending across the machine and supported at their ends in uprights 111 (see Fig. 87) carried by a supporting bracket 112 secured at its ends to the sides of the machine frame. The rods 110 are supported between their ends to prevent sagging, by uprights 113 on bracket 112. These rods are suitably spaced apart so as to give to all of said levers, though differing in length, substantially the same or a uniform movement at their ends 114. On the finger tip portions 115 of the keys are inscribed the characters and other signals employed. The forward ends of the key levers work in guide slots 116 in a plate 117 extending across the front of the machine, said key levers being normally held up against the top of said slots by springs 118 secured to the ends 114 of the key levers (see Fig. 5) and to a stationary strip 119 extending across the machine.

The extreme left hand key lever (Fig. 20) is the same as any of the key levers, except that instead of being provided with a finger tip portion such as 115 it connects to a space bar 121 which is supported near its ends upon levers 122 made fast to a rock shaft 123 journaled in the sides of the machine. By pressing the space bar down at any point in its length, downward motion will be imparted to the outer end of the spacing key lever.

In some uses of the machine, hereinafter to be described, it is necessary to lock the key levers against operation at certain intervals. This is accomplished in the machine shown (see Figs. 5, 20 and 21) by providing each key lever with a lip 124, which rests either above or below (according to the position of the key lever), the beveled edge of locking bar 125, which extends transversely across all the key levers. The bar 125 is supported at its ends upon side brackets 126, mounted fast on a shaft 127, journaled in the sides of the machine. Rocking motion is imparted to said locking-bar through the medium of a link 128 connected to one of the brackets 126 and to the lever end of a rocking lever 129, loosely mounted on a shaft 130, extending across the machine and mounted in the side thereof. The lever 129 receives its rocking motion from a rotating cam 131 made fast to the loose member of a clutch, hereinafter described, mounted on the constantly rotating clutch shaft 68. The periphery of cam 131 engages a small wheel 132 mounted in the upper end of said lever, the said wheel being constantly held against the periphery of the cam by the tension of a spring 133. This locking mechanism being essential in certain uses of the machine only, may obviously be omitted from the machine when desired.

The key levers act to impart longitudinal motion to one or more at a time of a group of longitudinally slidable selecting bars 134, mounted between two side plates 135 and 136 which extend transversely across the machine and are supported at their ends by brackets 137 and 363 made fast to the sides of the machine. (See Figs. 3, 5 and 20.) These bars are supported for sliding movement upon small rollers 138 mounted to rotate on pins 139 extending through slots 140, near each end of the bars, said pins 139 being supported by the side plates 135 and 136. The side plates 135 and 136 are provided respectively, with guide slots 141 and 142 in which the ends of the key levers work up and down in operating. For the purpose of operating the bars 134, each key lever is provided at its end with a beveled edge 143, while the bars 134 are each provided with cam edged lugs 144, so located as to be engaged in certain combinations by the beveled edges of the key levers and thereby caused to shift said bars. In the machine as shown, these bars are shifted to the right, viewing the machine from the front. The cam lugs 144 on the bars 134 are so disposed that the operation of a key lever will result in the longitudinal shifting of one, two or three of such bars, according to the character or signal which said key lever represents. The manner of arranging these lugs on the selecting bars will be clear from a study of Fig. 39 which shows in side elevation four of the bars removed from the machine. These lugs are simply arranged so that there will be the required number in line with each key lever to shift that one or combination of bars which corresponds to the character or other signal which the particular key lever represents. For example the letter "A" is formed by the $a$ and $d$ combinations or code positions. Therefore, the $a$ and $d$ bars 134 would each have a lug adapted to be engaged by the beveled edge of the "A" key lever, so that when the "A" key is operated the said $a$ and $d$ bars will be shifted. The space signal has but one code position, viz., the $d$ position. Therefore the key lever connected to the space bar would engage but one lug and that would be a lug on the $d$ bar 134; and this bar only would be moved.

Each of the bars 134 is provided at one end with an upward extension or lug 145 and these lugs are disposed in line, respectively, with downwardly extending lugs 146, on each of said combination bars. Therefore, when the selecting bars 134 move as described, they select and impart a similar movement to the proper combination bars and thereby bring the required slots thereof into alinement. The combination bars, in being shifted as described, in addition to selecting the proper latch or latches for engagement with the actuating bar, also act to operate an electrical contact device which controls the circuit of a magnet which in turn controls a clutch from which power is transmitted to the actuating bar. This contact mechanism is of peculiar construction and will now be described in detail, reference being had particularly to Figs. 40 to 44, inclusive. This mechanism comprises among other parts a lever 147, pivoted between two lugs 148, formed on the inside of a bracket 149, secured to the side of the machine. This lever is adapted to engage at its upper end a pin 150, slidable in said bracket to operate an insulated contact spring 151, which is mounted between and insulated from two other contact springs 152 and 153. The pin 150 has an insulating tip which prevents spring 151 from making electrical connection with the machine frame through said pin.

Pivotally connected to the side of lever 147 is a substantially U-shaped bracket 155. This bracket is provided with an extension or lip 156, which passes transversely across the ends of all the combination bars; and on the upper forward edge of this bracket is a cam plate 157, which is adapted to be engaged, as hereinafter described, by a lug 158 carried upon bar 56 which is one of the reciprocating supporting bars for the actuating bar of the machine. (See Fig. 21.) Contact is normally maintained between springs 151 and 152. When, however, one or more of the combination bars is shifted to bring about the required action of the machine, said bar or bars engaging the lip 156 on pivoted bracket 155 will force this bracket and therefore the lever 147 and pin 150 to the right (Figs. 40 and 44), thus breaking contact between the springs 151 and 152 and establishing contact between springs 151 and 153. The effect of this is to complete the circuit of the spacing clutch magnet 159, whereby the spacing clutch 160, indicated diagrammatically in Fig. 40 and hereinafter described in detail, is operated and sliding bar 56 caused to travel forward. In thus traveling, the lug 158 first engages the cam plate 157 and thereby causes the pivoted bracket 155 to tilt up, raising its lip 156 clear of the ends of the combination bars. The bracket 155 will continue to rotate upward on its pivots as the lug 158 advances toward the observer (Figs. 41 to 44) and when this bracket has thus rotated a short distance it will allow the lever 147 under pressure of spring 151 to be forced back to the position shown in Fig. 44. Then when bar 56 travels back, the lug 158 is carried backward out of engagement with the bracket 155 which then drops to its normal position. In the drawings, the moving parts of this contact device are shown in their normal position of rest in Fig. 40. Fig. 41, shows the positions of the parts after a combination bar has slid forward and engaged lip 156, pushing lever 147. Fig. 42 shows in top plan the parts in the positions they occupy in Fig. 41. Fig. 44 shows the parts after the lug has passed across the upper face of bracket 155. Fig. 43 shows the parts in transit from position Figs. 41—42 to position Fig. 44. This contact device will prevent the engagement of the spacing clutch for more than one revolution, and therefore the repetition of an operation no matter how long a key is depressed or how long the combination bars which have been operated remain in the operating position. The contact spring 152 is for use when the machine is employed as a transmitter as will more readily appear from the more detailed description of the electrical circuits to follow.

The diagram Fig. 40 indicates the electric circuit of the spacing clutch magnet in a very simple or elemental form, as for example, when the machine is operated by the keyboard as a typewriter or punching machine or both.

The spacing clutch magnet 159 is mounted in an extension of the general magnet supporting frame. (See Figs. 20 and 30.) This magnet is provided with an armature 162, pivoted as shown to the magnet frame. The top of this armature is pivotally connected to a rod 163, which at its upper end is connected as shown to an arm 164 of a bell crank lever. The arms of this lever are formed on a sleeve 165 mounted loosely on shaft 130. The other arm 166 of this lever extends upwardly from said sleeve and is provided at its upper end with a nose 167 which controls the operation of the spacing clutch (see Fig. 30). The spacing clutch, as shown most clearly in detail in Fig. 23, comprises, among other parts, a collar 168, made fast on the shaft 68 and provided with radial teeth 169 cut in an annular extension 170 thereon. This collar forms the fast member of the clutch. The loose member of the clutch consists of a hub 171 loosely mounted on the shaft 68 and provided with an annular channel 172 formed between two annular flanges 173, and with an extension to which is made fast the sprocket wheel 67 hereinbefore referred to. This sprocket wheel is geared as described to the sprocket 65 on the shaft 64, which, acting through the connecting rod 62 and associated parts hereinbefore described, transmits the necessary motion to the actuating bar 52. The fast and loose members of this clutch are at times coupled together by means of a connecting pin 174 mounted in rectangular openings in the flanges 173 for sliding movement laterally of the hub. For this purpose pin 174 has cut in one end a series of teeth 175 which are adapted to engage the teeth on the fast clutch member 168. This connecting pin at its end opposite its teeth is under tension of a spring 176, which is in turn fast to the hub 171. The action of this spring is to normally force the pin 174 toward the fast clutch member and thus normally tend to couple the two members. The fast and loose clutch members are disengaged by shifting pin 174, under the tension of its spring 176 out of engagement with the teeth of the constantly rotating or fast member, and this is effected by causing the nose 167 on the end of the lever 166 to engage a cam surface 177 on the clutch pin and thus shift it back against the tension of spring 176. This pin is cut away as at 178 to receive nose 167 (see Fig. 27). The normal position of this nose is in engagement with pin 174, hence the loose member of the clutch is normally uncoupled from the constantly rotating member. Nose 167 is normally forced toward the clutch under tension of a spring 179 acting on a tail piece 180 of the clutch magnet armature.

In certain uses of the machine, hereinafter pointed out, the spacing magnet operates a pair of electrical contacts 181 and 182. This may be effected by making fast to tail piece 180 of the magnet armature an insulating pin 183 which, when the magnet is energized and attracts its armature, will cause pin 183 to force contacts 181 and 182 together. (See Fig. 30).

The paper carriage of this machine comprises among other parts two end frames 184 and 185 connected by brace rods 186 and 187 and by a bar 188 extending across the bottom of the carriage. For detail views of this carriage see Figs. 45 to 49.

The paper to be printed on or perforated is preferably supplied to the machine in the form of a continuous sheet from a roll wound on a core 189 (Fig. 5) which is rotatably supported upon a rod 190 passing through and supported by the end frames of the carriage. This rod is provided at one end with a knob 191 fast thereon, and at its other end is screw-threaded to receive a removable knob 192 by which the said rod is retained in the carriage. By removing knob 192, rod 190 may be withdrawn and the paper core removed and a fresh roll placed in the carriage. Made fast on the cross bar 188 of the carriage is a bracket 193 which is slidably mounted on a rod 194 which extends across the machine. The side frames of the carriage are provided with extensions in which are journaled the ends of a paper feed roller 195, through the longitudinal axis of which passes the lining shaft 196. The roller 195 is supported on the shaft 196 by bushing 197, fitted into and made fast to each end of the roller. These bushings are free to slide longitudinally of the shaft, but each carries two keys 198 which engage longitudinal slots 199 in the shaft 196, thereby permitting the roller 195 to travel longitudinally of the shaft, but holding it against rotation relative to said shaft. The paper feed roller 195 carries near each end a series of equally spaced tapered pins 200, the office of which is to engage the marginal perforations in the paper and thus, by the rotation of the roller, to positively and uniformly feed the paper through the machine. The distance between the centers of the successive holes of the marginal rows in the paper must be identically the same as the distance between centers of successive pins in the two rows at the ends of the cylinder. Extending alongside the paper feed roller is a presser roller 201 journaled in uprights 202 pivoted to extensions on the side frames of the carriage. This roller presses against the paper under tension of springs 203, and holds it firmly against the paper feed roller. Extending from one of the side frames to the other across the bottom of the paper carriage is a supporting plate 204 in which is adapted to rest a small pan 205 or other suitable receptacle to catch the punchings as they fall from opening 28.

201ª indicates a knife-edge plate extending longitudinally across the top of the paper feed roller and made fast to the side frames of the carriage. This may be used to assist in tearing off the message blanks as they pass from the machine.

The lining shaft 196 is journaled at its opposite ends in upright extensions of a frame 206 which extends across the machine and is made fast to the sides thereof. (See Figs. 4 and 56). On one end of this shaft is made fast a star wheel 207, which coöperating with a roller 208, held against its periphery by a lever 209 under tension of spring 210, holds the shaft against slipping from certain definite positions to which it is rotated. This is particularly important when the machine is used for perforating message blanks for automatic transmission, since it is important that there be a definite and constant relation between the marginal perforations in the paper and the code perforations made by the machine.

The mechanism for operating the lining shaft whereby the paper is fed up one or more lines will be described after the description of the carriage spacing mechanism.

The carriage is caused to travel step-by-step across the machine from right to left to effect the proper spacing of the characters, words or other signals, by means of a rotating screw 211, the threads of which engage those of a nut 213 on the carriage. This screw, which extends across the machine and is located under the paper carriage, is of peculiar construction and is shown most clearly in the detail views Figs. 50, 51 and 52. It is cut with a triple thread 212, which is removed for something more than two-thirds of its circumference. The nut 213 is also provided with a corresponding triple thread (see Figs. 45, 46 and 47). This nut is supported for sliding adjustment on two rods 214, which pass through it and are made fast in the bracket 193 of the carriage. The nut may be adjusted on said rods by screws 215. The spacing screw 211 is rotated one revolution for each space, and for this purpose is driven by sprocket 66 mounted fast thereon and geared to sprocket 67 of the spacing clutch which has been described.

The lining shaft, at its end opposite the star 207 wheel, is provided with a reduced extension 216 (see Fig. 56), upon which is mounted a sprocket 217, through which power is transmitted to drive the said shaft.

This sprocket is loose on the shaft, but is connected to drive the same through pins 218, made fast to a longitudinally slidable sleeve 219, said pins being adapted to pass into holes in the said sprocket. The sleeve 219 connects with the shaft extension through a pin 220 fast to the said sleeve and adapted to move in a slot 221 in the shaft extension. The sleeve 219 is normally held in the position shown in Fig. 56, under the tension of a coil spring 222 held between a shoulder on the interior of the sleeve and a nut 223 on the end of the shaft extension. The purpose of this arrangement is to allow the rotation of the lining shaft by hand independently of its regular power mechanism. To do this the sleeve 219 is pulled to the right, in Fig. 56, thus disengaging the pins 218 from the sprocket 217, when the lining shaft may be rotated independently of said sprocket. For the purpose of operating this sleeve it may be provided with a milled head 224. The sprocket 217 of the lining shaft receives its power by being geared to a small sprocket 225, fast on an elongated sleeve 226, mounted upon a longitudinally slidable countershaft 227. This countershaft is connected to the sleeve 226 by means of a pin 228 on said shaft engaging a slot 229 on the interior of said sleeve. The shaft 227 receives its power from a sprocket 230 made fast to a sleeve 231, also mounted on said countershaft. This countershaft is slidable longitudinally through the sleeve 231, but is always connected to rotate therewith by means of a pin 232 on said shaft engaging an elongated slot 233 formed on the interior of the sleeve 231. The sprocket 230 is the main driving sprocket in the system of gears shown in Fig. 63, and, acting through the pin and slot connections, in the positions shown in Fig. 56, transmits power to the sleeve 226 and thence to the lining shaft without being transmitted through the intermediate gear 234, the office of which will hereinafter be described. With this train of gearing, the spaces between the lines of printed matter will be sufficient to allow the perforations to come between the printed matter. When, however, it is desired to print without perforating, it is not necessary that the distance between successive lines of printed matter shall be so great. The changing from the wider to the narrower line spacing is effected in this machine by shifting the countershaft 227 to the left, thus changing the speed relation of the gears which drive the lining shaft. When the countershaft is thus shifted, the pin 228 thereon passes out of engagement with the sleeve 226 and into engagement with a slot 235 on the interior of the collar 236 of sprocket 234, loosely mounted on the countershaft. This sprocket 234 is in turn geared to a sprocket 237 mounted on a stud shaft 238 secured to the side frame of the machine. The sprocket 237 is made fast to a sprocket 239, which is in turn geared to sprocket 240 fast on sleeve 226. Therefore, when power is applied to the countershaft 227 from sprocket 230, this power will not be transmitted directly to the sleeve 226, but indirectly through sprockets 234, 237, 239 and 240, which will cause a smaller rotation of the sleeve 226 and therefore a smaller rotation of the shaft 196 for each lining operation. The countershaft 227 is provided with a knob 241 by which it may be shifted, and is held in its two operative positions by means of a ball 242 which may rest in either of two cavities 243 or 244 in the shaft according to which of the two said positions the shaft occupies, said cavities being provided with slanting sides, as shown. The ball is mounted in a hole in the collar 231 and is retained therein by means of a spring 245. The sprockets 217 and 225 and their chain may be inclosed in a gear case 246 mounted on one end of the frame 206 as shown in Fig. 3. The main driving sprocket 230 of the lining countershaft is geared to a sprocket 247, made fast on an extension or collar 248 of the hub 249 of the lining clutch 250, shown in detail in Figs. 24 and 25. This clutch is the same in general principles as the other clutches, but is modified somewhat in construction to adapt it to its slightly different operation. The normally loose members of the other clutches remain coupled up for one revolution at a time, while the normally loose member of the lining clutch remains coupled for only a quarter revolution at a time, when feeding the paper up for the successive lines. For this reason, the lining clutch is provided with one clutch pin 251, having teeth 252 adapted to engage with teeth 253 on clutch member 254 fast on shaft 68, as in the case of the spacing clutch, and three additional pins 255, which are substantially the same as the clutch pin 251, except that they have no teeth and act merely as disengaging devices to separate the pin 251 from the fast member of the clutch. All of said clutch pins must therefore be operatively connected together. This is effected by means of a flange 256, engaging a recess 257 in each of said pins, the said flange being formed on one end of a collar 258 slidable longitudinally on an extension of the clutch hub 249 which is loose on the shaft 68. This collar is normally pressed toward the constantly rotating clutch member 254 by means of a coil spring 259 held between the flange 256 and a flange 260 on a collar 261, fast on the clutch hub extension 248. The sprocket wheel 247 is held fast between collar 261 and a collar 262, screwed on the end of the extension 248 of the clutch hub. The pins 251 and 255 are each provided with an opening 263, one of the edges of which has a cam face 264 just as in the case of the pin shown in Fig. 27. Normally resting in the opening 263 of one of these clutch pins, by which the teeth of pin 251 are normally disengaged from teeth 253 of the normally rotating clutch member, is a nose 265 (Figs. 21 and 28) carried on the upper end of lever 266 which is fulcrumed by means of sleeve 267 for angular movement on shaft 130. This lever is pulled toward the lining clutch by spring 268 secured at one end to lever 266 and at its other end to a stationary rod 269 extending across the machine. (See Fig. 28).

Pivoted on lever 266 are two arms 270 and 271, one of which is pivoted to each side of said lever, as shown most clearly in Figs. 28 and 63. The forward end of arm 270 extends through a loop 272, consisting of a metal strip made fast to that slide bar 47 which operates the striker bar which will perforate the paper with that combination of perforations corresponding to the lining signal. The arm 270 is provided with a shoulder 273, the top of which is normally held in engagement with the under side of the top of loop 272 by the tension of a spring 274. The other arm 271 pivoted on the lining clutch lever is provided with a shoulder 275 similar to the shoulder 273. The tail of arm 271 is normally held under tension of spring 276 up against the under side of the top of a loop 277 formed on an extension 278 of an arm 279 pivoted to a lever 280 integral with a sleeve 281 made fast on shaft 130. Arm 279 is limited in its vertical motion by a stationary loop 279$^a$ secured to the bar 50 and surrounding arm 279 (see Fig. 28). The upper edges of both arms 270 and 271 are normally held up toward the under side of a yoke 282 made fast to slotted bar 50 and provided with a cam plate 283 adapted under conditions hereinafter described to engage the rear of shoulders 273 and 275 and depress the forward ends of arms 270 and 271. The function of lever 280 and its connection through loop 277 with arm 271 is to operate the lining clutch when either the backing or blanking or both mechanisms work. This will more readily appear later. There is also fast on sleeve 281 an upright lever 284 having at its upper end a nose 285 adapted to control the operation of the backing clutch 286 in just the same way that nose 167 controls the spacing clutch. The spacing and backing clutches being substantial duplicates, a detail description of the latter is unnecessary in view of the preceding description of the spacing clutch. The lever 284 is pulled toward the backing clutch under tension of spring 287 secured to said lever and to rod 269. (See Fig. 28). The normally stationary member of the backing clutch carries a sprocket wheel 288 fast thereon, and this sprocket is geared to a sprocket 289 which drives the backing screw (see Figs. 22 and 50). The function of this backing screw is to send the paper carriage back to the commencement of its travel after it has advanced a part or all of the way across the machine. This backing screw is shown most clearly in Fig. 50, consists essentially of cylinder 290 extending transversely of the machine below the carriage and having upon its circumference a raised spiral 291 which is adapted to engage a small roller 292 rotatably mounted on the bottom of the carriage supporting bracket 193. (See Fig. 45). This spiral has a constant pitch except for one revolution near one end, where the pitch decreases, as at 293 to zero, in less than one revolution. At this end the screw is provided with a flange 294 which acts as a stop for the roller 292. It is evident that as this screw rotates in one direction, its spiral engaging roller 292 will push the carriage along. The direction of this rotation is such as to return the carriage to its starting point. The cylinder 290 of this screw is fast on a shaft 295 which extends across the machine beneath the carriage and is journaled in the sides of the machine. This backing screw is driven, as before stated, by power applied to sprocket 289. This sprocket, however, is not itself connected directly to the backing screw, but is fast on sleeve 296, which is loosely mounted on the shaft of the backing screw (see Fig. 50). This sleeve 296 carries a radial pin 297 which is adapted at times to engage a lateral pin 298 made fast to a sleeve 299, slidable longitudinally on shaft 295, but held against rotation thereon by pin 300, engaging slot 301 in said sleeve. The sleeve 296 carrying sprocket 289 is held against lateral movement toward the backing screw by means of collar 299ᵃ fast on shaft 295. The sleeve 299 is provided with two annular flanges 302 between which extends the fingers 303 of an arm 304 forming an extension on a sleeve 305 mounted loosely on the spacing screw shaft. This sleeve is provided with a cam projection 306, which fits normally into a correspondingly shaped recess in a sleeve 307, made fast on the shaft of the spacing screw 211. The sleeve 305 is forced in the direction of sleeve 307 under tension of coil spring 308 on the spacing screw shaft. From this construction it will be seen that when rotation clockwise is imparted to the spacing screw shaft 211 the cam projection 306 will ride upon the cam surface or sleeve 307, the sleeve 305 being caused thereby to be shifted laterally to the left. This shifting, by virtue of the connection of the arm 304 with sleeve 299, shifts said sleeve also to the left thus removing pin 298 from the path of pin 297. This disengages the backing screw shaft from its driving sprocket 289, and leaves it free to be rotated by the roller 292 on the carriage, in the forward travel thereof. If the backing screw remained all the time geared to its power clutch, the roller 292 striking the spiral 291 on the forward movement of the carriage would not only stop the carriage, but the backing screw would try to rotate the backing clutch loose member backward, hence it is essential that the backing screw be absolutely free while the carriage is passing forward. Directly after each spacing operation, however, the backing screw becomes coupled up to its power sprocket 289 by the returning of the sleeve 305, under tension of spring 308, to its normal position. In addition to the decreasing pitch of spiral 294 at the right-hand end of the backing screw, I may provide any suitable shock-absorbing means for lessening the jar occasioned by the carriage reaching the end of its back travel. In the drawings (Figs. 22 and 50) I have shown for this purpose a spring 309 made fast to a collar 310, by means of a screw 311 adjustable on the shaft 194. The spring 309 engaging the bracket 193 of the carriage takes up the shock.

Since levers 284 and 280 are fast on the same sleeve 281 it will be seen (see Fig. 28) that when lever 284 is rocked to couple up the backing clutch, the lever 280 will be rocked in the same direction, pulling arm 279 with it. Loop 277 on this arm being normally in front of the shoulder 275 as shown in Fig. 28, will then cause the lever 266 of the lining clutch to withdraw its nose 265 from that clutch starting the normally stationary member of that clutch to rotating and therethrough operating the lining clutch. It will therefore be seen that each time the carriage is sent back to its starting point it automatically feeds the paper up at least one line. In some cases the paper is fed up the distance of several lines, an operation herein referred to as "blanking," and which will now be described.

Pivoted to the actuating lever 284 of the backing clutch is an arm 312, the forward end of which extends through a loop 313 made fast to one of the sliding bars 47. (See Fig. 28.) This arm 312, like the arm 270 is provided on its upper edge with a shoulder 314 normally held up against the under side of the top of loop 313 under tension of spring 315. The loop 313 striking the forward edge of shoulder 314 on the back stroke of the sliding bar, as hereinafter more particularly described, rocks arms 284 back against tension of spring 287 thereby causing the nose 285 to be withdrawn from the clutch pin of the backing clutch. This causes the loose member of the backing clutch to be coupled to the normally rotating member, which latter transmits, through sprockets 288 and 289, (see Fig. 22) rotation to the backing screw 290, which screw thus rotating will send the carriage back to the commencement of a line. The fast and loose members of the backing clutch are disengaged from each other when the carriage has reached the end of its travel by the nose 285 on the backing clutch lever again engaging the connecting pin of that clutch. This is brought about by cam 316 (Figs. 3, 45, 46 and 47) fast on the bracket 193 of the carriage tripping a dog 317 fast on a spindle journaled in bracket 318 on the frame of the machine, and made fast at its end opposite dog 317 to one end of a lever 319 which at its other end is pivotally connected to a link 320 pivoted to arm 312. It will be seen that when the cam 316 on the carriage trips the dog 317, this will force lever 319 down, and this in turn acting through link 320 will force the arm 312 down and thereby remove its shoulder 314 from engagement with the edge of the loop 313, thus allowing the clutch lever 284 to be pulled by spring 287 into engagement with its clutch pin. This operation will be hereinafter more fully described.

When the machine is employed to prepare message blanks for automatic transmission, or when it is employed as an automatic printing telegraph receiver, it is desirable to have the paper which is fed to the machine in the form of a succession of connected telegraph blanks, as indicated in Fig. 60, each of said blanks having its individual heading. In such cases it is particularly desirable that the paper shall be fed from one of such blanks to the next, past the headings, as quickly as possible—quicker than could be done by stepping the paper up by the regular lining mechanism alone. In the present machine this is accomplished by certain mechanism auxiliary to the regular lining and backing mechanisms. This mechanism (see Fig. 28) comprises among other parts, an upright lever 321 carried by a sleeve 322 mounted loosely on the shaft 130, to which lever is pivoted a horizontal arm 323 which extends through a loop 324 fast on that sliding bar 47 which actuates that striker bar corresponding to the "blanking" signal. This arm 323 is also provided with a shoulder 325 on its upper edge which is normally held up against the under side of the top of loop 324 under tension of spring 326. In effecting this blanking operation, that one of the sliding bars 47 corresponding to the "blanking" combination takes up its motion, just as do any of the other sliding bars connected to the various striker bars. In thus moving, the sliding bar carries loop 324 in a direction toward the front of the machine (away from lever 321, Fig. 28), causing loop 324 to pass from engagement with shoulder 325. This allows the arm 323 to fly up a limited distance until its tail strikes the top of loop 324. Then when the sliding bar carrying loop 324 has nearly reached the end of its back travel, loop 324 engaging the forward edge of shoulder 325, will force arm 323 backward. This rocks lever 321 back, and this lever engaging an extension 327 on the lining clutch lever will rock that lever back, thereby withdrawing its nose from the lining clutch and thus causing the fast and loose members of that clutch to become coupled together. This puts the lining mechanism into operation. The loop 324 abutting against shoulder 325 will continue to hold the lever 266 back so that its nose will be out of engagement with the lining clutch, thus allowing the lining mechanism to continue feeding the paper up in the machine until some other mechanism acts to disengage the forward edge of the shoulder 325 from the loop 324. This is brought about by causing a cam link 328 (see Figs. 61 to 63) on a sprocket chain 329 to engage and force downward the end of a lever 330 which transmits, through a link 331 connected thereto and to the end of the arm 323, downward motion to said arm thereby releasing the forward edge of shoulder 325 from engagement with the edge of loop 324, allowing arm 323 to pass forward through said loop. This allows nose 265 to return to engagement with the connecting pin of the lining clutch and to thus uncouple the loose from the fast member of the clutch, thereby stopping the lining mechanism.

The sprocket chain 329 is mounted on the sprocket 240 on the sleeve which drives the lining shaft, and on sprocket 239 fast on a sleeve with sprocket 237, said sleeve being mounted loosely on stud shaft 238 made fast to the side of the machine frame as before described.

When a certain number of lines have been printed and perforated on a blank, the blanking mechanism may operate automatically to bring a fresh blank into position. For this purpose sprocket chain 329 is provided with a second cam link 332 arranged to travel in the path of an extension or wing 333 on an upright lever 334, which is fast at its lower end on a sleeve 335 mounted loosely on a stud shaft 336 secured to the side of the machine. The cam 332, however, is so disposed on the chain that it will travel past lever 330 without engaging it. The other end of sleeve 335 is made fast to a downwardly extending lever 337 which is flexibly connected through a link 338 to the end of arm 323. After a given number of revolutions of the lining shaft the cam 332 will be brought into engagement with wing 333 and striking this wing will force lever 334 in the direction of the travel of said cam, thus forcing lever 337 in the direction of the arrow Fig. 28. This lever in turn forces arm 323 in the direction to operate the blanking mechanism as described.

The operation of this automatic blanking is then stopped when cam 328 strikes the end of the lever 330 after the lining shaft has made a sufficient number of revolutions to bring the next blank into proper position.

When the machine receives a blanking signal, or whenever the blanking key is operated, the carriage will automatically be sent back to the commencement of a new line. For this purpose, the blanking lever 321 (Fig. 28) is provided with a horizontal extension or arm 339, which passes in front of the blanking lever 280. Therefore, when the lever 321 is moved by arm 323 to operate the lining shaft, arm 339 carried by lever 321, will engage lever 280 of the backing mechanism, and cause this arm to transmit through sleeve 281 of the lever 284 the necessary motion to remove nose 285 from the backing clutch and thereby allow the normally loose member of said clutch to become coupled to the rotating member, transmitting the necessary motion to the backing screw. It is important that during these operations of lining and backing that the spacing mechanism shall not operate. This is effected by a locking device (see Figs. 28 and 30) located near one end of shaft 130 and consisting of a latch 340, pivoted at one end on a stud shaft 341 made fast to the machine frame, and connected by means of a link 342 with an arm 343 fast on a collar 344, which is in turn made fast to shaft 130. The end of latch 340 opposite its pivot is provided with a shoulder 345, which, when the arm 343 is rotated downward, is brought into the path of a pin 346 on the lever 166 of the spacing clutch. Therefore, whenever the levers 280 or 284 are moved to start the backing mechanism, they rotate shaft 130 and this shaft being fast to collar 344 sends latch 340 downward, thus pulling the shoulder 345 of said latch into the path of pin 346, thereby locking the lever 166 against movement away from its clutch. To prevent jamming, the arm 343 is connected to link 342 by pin and slot connection 342ª and 342ᵇ, the slot being held down against the pin by spring 342ᶜ. Therefore, if the lever 166 is thrown to the left (Fig. 30) when the arm 343 rotates, this will merely extend spring 342ᶜ. The loose member of the backing clutch is provided with a cam surface as indicated by dotted lines in Fig. 26. The object of this is to keep the actuating lever of the backing clutch out during an entire revolution so that arm 343 will not return to its normal position and thereby release the locking latch 340 before the backing clutch has finished revolving.

When the key-locking mechanism is used, an additional clutch 347, which shall be designated the "clapper" clutch, is employed. This clutch is a substantial duplicate of the spacing clutch, except that where the spacing clutch carries the sprocket wheel 67 fast on the loose member of the clutch, the clapper clutch carries the cam disk 131. The actuating lever 348 of the clapper clutch is provided with a pin-engaging nose 349 (see Figs. 21 and 28) which forms one arm of a bell-crank lever provided with a collar 350 mounted loosely on shaft 130. The other arm 351 of this lever is secured through an upright arm 352 to the top of pivoted armature 353 which is operated by electromagnet 354 mounted in a cavity 355 in the magnet frame, as in the case of the spacing magnet. (Fig. 5). The armature of this magnet is normally held in the raised position by spring 356. This armature, like the armature of the spacing magnet, has a tail piece 353ª which carries an insulating pin 353ᵇ adapted to operate contacts 353ᶜ and 353ᵈ as hereinafter described in connection with the telegraph circuits. The circuits of the clapper magnet will also then be described.

The frame of the machine may be of any desired construction. In the form shown, however, it comprises a base portion 377 and an upper portion 378 removably secured to the said base portion, the latter carrying the magnet frames, the key-board mechanism including the selector bars, and the small electric motor which drives the machine, while the clutches, striker bars, carriage mechanism and other parts are located in the upper frame portion. By making the frame separable in this manner the parts are rendered accessible.

The operation of the machine as thus far described is briefly as follows: It shall be assumed that a fresh paper blank has been fed into the machine to occupy the proper position for the commencement of the preparation of a message blank such, for example, as shown in Fig. 1, and that the machine is operated manually from the keyboard, and, further, in order to bring into operation as much of the mechanism as practicable it will be assumed that the keyboard is employed as a normally locked keyboard, bringing into operation the "clapper" mechanism. This operation can be followed best by referring principally to Fig. 5. The clutch shaft 68 is continuously rotated by the motor 70 and the clapper magnet 354 is energized at regular intervals by the completion of an electric circuit to be described later. Each time this magnet becomes energized it draws its pivoted armature which removes the nose 349 of the clapper clutch 347 from the connecting pin of that clutch, but magnet 354 being energized only instantaneously, nose 349 will fly back to the path of the clutch pin immediately after receding therefrom. The effect of this is to cause the normally loose member of said clutch to become coupled to the fast member thereof for one revolution only, since nose 349 will engage its clutch pin and disengage the clutch members just as soon as the said pin comes around to the nose again. This causes cam 131 to rotate one revolution and in so revolving it acts upon the upper end of lever 129 to send the lower end of that lever forward and thus rock the locking bar 125 out of the path of the lips 124 of the key levers, thereby allowing the end 143 of that key which is pressed down to rise, the said locking bar immediately returning to its original position thereby locking the said keys, by passing beneath the lip of the operated key and over the lips of the keys not operated. The effect of this operation of the key is to bring its cam surface 143 into engagement with that row of cam lugs on the selector bars 134 immediately in line with the edge of the key operated, thus transmitting lateral motion to one, two or three of said bars, as the case may be, depending upon the combination of such bars representing the character which is to be impressed on the paper. These selector bars in thus being shifted, act through the lugs 145 on their ends, as described, to shift a corresponding number of combination bars 71 to the right, (see Fig. 3) viewing the front of the machine. These combination bars, in being thus shifted, strike the lip 156 on the lower edge of the pivoted bracket 155 of the electrical contact device (see Figs. 40 to 44) causing the central spring 151 of said device to engage spring contact 153, thereby completing a circuit, which energizes the spacer magnet 159, (see Fig. 30). The spacing magnet then pulls down its armature 162, the effect of which is to pull the nose 167 of the lever 166 of the spacing clutch out of engagement with the clutch pin of that clutch, thus allowing the fast and loose members of said clutch to become coupled together. The circuit of the spacing magnet, however, is broken immediately after it is completed, by the operation of contact device, Figs. 40 to 44, as hereinafter described, thus allowing the nose of the spacing clutch lever to fly back to the path of the clutch pin immediately after coupling up the clutch members. Therefore, when the clutch pin rotates one revolution it will again engage nose 167 and uncouple the clutch. The normally loose members of the spacing clutch therefore, rotates one revolution. In thus rotating the normally loose spacing clutch member 171 (Fig. 23) rotates sprocket 67 fast on said member and through this sprocket rotation is communicated to sprocket 65 on the shaft of the spacing screw, which is thereby started to rotate. The rotation of the spacing screw shaft causes the rotation of cam 98 mounted fast thereon, which cam is rotated in the direction of the dotted arrow, Fig. 4. Directly after this cam commences to rotate the latch head 97 on lever 96 will drop from the elevated portion of said cam down to a portion thereof considerably nearer its center. When this happens the releasing bar 90 under the latch tail pieces 72, acting through its connection with the lever 96 will be allowed to descend, thereby allowing that one of the tail pieces 72 which is above the row of alined slots in the combination bars corresponding to the combination for the character to be printed to be pulled by its spring 75 into the alined slots. This causes the operated latch to send its engaging shoulder 54 (see Fig. 34) into the path of the actuating bar 52.

When rotation was imparted to the spacing screw shaft, this also imparted rotation to the crank disk 63 which, acting through connecting rod 62, crank arms 61 and 58 and links 59 starts the actuating bar forward. This bar, in its forward travel, engages the head of the actuated latch 53, and continuing its forward movement pulls said latch along with it, and, since the said latch is pivoted to sliding bar 47 forward travel is imparted to this bar also. This movement of the sliding bar pulls the link 44 forward, and this link acting on the short arm of the striker bar lever to which it is connected, swings the striker bar quickly on its pivot, thereby sending the type on its head into engagement with the ribbon in front of the paper, also sending the lugs 9 on the striker bar head into engagement with those anvils of the punching mechanism corresponding to said lugs, thereby causing the operation of corresponding punching pins.

When the actuating bar moves forward as described, it carries with it through the connection shown most clearly in Fig. 31, the lower end of lever 34, causing this lever to rock the shaft 32 so as to bring the stripper plate into the position shown in Fig. 11. After the perforation is effected and the actuating bar starts on its back travel, the same mechanism rocks the stripper shaft in the opposite direction, causing the stripper plate to return those pins which have been actuated to their original positions as shown in Fig. 10. In this position they are withdrawn from the paper. As the frame of the actuating bar moved forward, lug 158 thereon engaged cam plate 157 of the contact mechanism shown most clearly in Figs. 40 to 44, thereby causing bracket 155 to tilt up and allow lever 147 to spring back to the position shown in Fig. 44, thus breaking the circuit of the spacing magnet. As cam 98 continues its rotation the head 97 of the lever 96, (Figs. 50, 55 and 4) in engagement with the periphery of said cam, for about the first half of the revolution of said cam passes over a portion thereof substantially concentric with its center, while the actuated latch 53 is in engagement with the actuating bar and the printing and perforating is being actually done. At about the end of the first half of the revolution of this cam the head of lever 96 passes on to a slightly raised portion of said cam, and then on to a portion of said cam which increases rather rapidly in diameter. The effect of this is to send lever 96 rather rapidly downward for a short distance, thereby causing the releasing bar 90 to rise for a short distance rather suddenly. In thus rising this bar engages the lower edge of the tail piece of the actuating latch and rather quickly lifts it. The head of lever 96 then comes into engagement with a portion of cam 98 which very gradually increases in diameter terminating at shoulder 99 on said cam. The effect of this is to cause a more gradual rise of the bar 90 during the latter portion of its upper movement than at the beginning thereof. During the latter portion of such movement the bar 90 has to engage and lift all the latch tail pieces, whereas during the first portion of its travel upward it has to lift one only of said latches. This is the end of the operations necessary to print and perforate the character on the paper. As these operations are repeated, the carriage will travel step by step from right to left across the machine.

When the desired number of characters have been formed on a line and it is desired to return the carriage to the commencement of a new line the backing key is operated. This key is just the same as any of the regular character keys, and is provided with its corresponding sliding bar 47, latch 53 and striker bar 2, the latter provided on its head with suitably arranged lugs 9 to cause the perforation of the paper with a code arrangement of perforations corresponding to the "backing" signal which, as will be seen from the diagram Fig. 2, occupy the a, b and g positions. On the striker bars for perforating the spacing, lining, backing and blanking signals the type are of course omitted. When this backing key is operated its sliding bar 47 passes first toward the front of the machine as do any of the other sliding bars and then travels back. In thus moving forward said sliding bar carries loop 313 forward out of engagement with shoulder 314 on arm 312 (see Fig. 28). This allows the forward end of arm 312 to rise until it strikes the under side of loop 313. Then, when the sliding bar carrying said loop has nearly reached the end of its back travel, said loop will engage shoulder 314 and push arm 312 backward. This rocks lever 284 back, thus removing nose 285 from the pin of the backing clutch, thereby coupling the normally stationary or loose member of said clutch to the rotating member and communicating through gears 288 and 289 (see Fig. 22) rotation to the backing shaft. This causes the carriage to be sent back to the commencement of its travel. When the carriage has about reached the end of its back travel, the lug 316 tripping dog 317 sends the lever 320 down, thereby releasing shoulder 314 from the upper edge of loop 313. This allows lever 284 to return its nose 285 to the backing clutch and thereby disengage the normally loose from the fast member of the clutch, stopping the rotation of the backing screw. When lever 284 was operated to start the backing screw, said lever imparted through sleeve 281, angular movement to lever 280, and this lever acting through arm 279 and loop 277 and shoulder 275 on arm 271, also caused lever 266 of the lining clutch to withdraw its nose from said clutch, thereby causing the fast and loose members of said clutch to become coupled and operate the lining shaft to feed the paper up a line. Directly after the withdrawal of the nose of the lining clutch from said clutch, shoulder 275 on arm 271, strikes cam plate 283. This causes the forward end of arm 271 to be sent downward, thereby removing shoulder 275 from engagement with the edge of loop 277. As soon as this happens the arm 271 becomes released and allows spring 268 to send the nose 265 of the lining clutch lever into position to engage the next pin of said clutch. Since this clutch is provided with four such pins the normally stationary member of said clutch will be rotated but a quarter revolution before it is disengaged in performing the regular lining operation. It will, therefore, be seen that when the carriage is sent back to the commencement of its travel the paper is automatically fed up a line.

If it is desired to pass to a new line without backing the carriage, this is effected by operating the lining key which, like the backing key, is provided with its corresponding sliding bar 47, latch 53 and striker bar 2, the latter carrying a suitable arrangement of lugs to cause the paper to be perforated with such an arrangement of perforations as will represent or transmit the lining signal. This lining signal, as will be seen from the diagram Fig. 2, is formed by perforations occupying the a, b and f positions. When the lining key is thus operated its sliding bar 47 travels forward to effect the perforation of the lining signal and allows the forward end of arm 270 (see Fig. 28) to rise and thereby place the forward edge of shoulder 273 in the path of loop 272. On the back travel of the sliding bar 47 connected to this loop, the said loop will strike the forward edge of shoulder 273 pushing arm 270 back and releasing the nose 265 from the pin of the lining clutch, thereby causing the normally loose member of said clutch to become coupled to the fast member which will then rotate the lining shaft. Directly after the nose 265 is thus withdrawn from the lining clutch, the shoulder 273 will engage cam plate 283, thereby disengaging said shoulder from the rear edge of loop 272, allowing the nose 265 to return to the lining clutch in time to engage the next pin so as to stop the rotation of the lining shaft.

When it is desired to space without printing, and to perforate the paper with a perforation corresponding to the spacing signal, the space bar is operated, and this causes the shifting of a certain combination bar (the $d$ bar Fig. 38) necessary to cause the alinement of a certain combination of slots in said bars, as in the case of any other signal. This bar thus becoming shifted energizes, as before described, the magnet of the spacing clutch, thereby operating said clutch and causing the carriage to space as described. The alining of the slots in the combination bars to represent this spacing signal permits the engagement of the latch on a sliding bar 47 to operate a striker bar 2, having a lug suitably arranged thereon to operate the punching pin corresponding to the code arrangement for the transmission of a spacing signal.

The operation of feeding the paper up from one blank to a succeeding blank was fully described in the detail description of the machine, and, therefore, need not be repeated here.

In the foregoing operation of the machine it was assumed that the machine was manually controlled through the keyboard. If it is desired to operate the machine electrically or by distant control, the bars 71 are simply shifted by the magnets 99, acting on said bars through their pivoted armatures engaging lugs on said bars as described. By energizing these magnets in certain combinations corresponding combinations of selector bars 71 may be operated. The rest of the operation of the machine is the same as when controlled manually from the keyboard.

When the machine is used as a combined manual transmitter and home recorder, that is, a recorder of the messages which it transmits, or used simply as a manual transmitter, the bars 134, actuated from the keyboard operate a series of transmitting contacts which in turn act upon electric circuits as hereinafter described to transmit the signals. For this purpose each of the bars 134 in the machine shown is provided with an extension 357 at one end, and located respectively in line with these extensions are eight contact springs 358 supported by being clamped beneath two insulating blocks 359 and 360, and thus insulated from each other (see Figs. 64 to 69 inclusive). These supporting blocks are made fast to insulating supports 361 and 362 secured to a plate 363 made fast to the machine frame. The contact springs 358 are connected respectively to eight terminal rods 364 which are made fast in and extend through the blocks 361 and 362. The inner ends of these rods are electrically connected respectively to individual plug sockets 365 carried in an insulating block 366 secured to an extension on the bracket 363. These connections may be made by simply carrying leads from the various terminal rods 364 to their respective plug sockets, and are omitted from the drawings for the sake of clearness. These springs are arranged in two groups of four springs each and the springs of each group occupy a position between two sets of spring contact fingers 367 and 368. These fingers are integral respectively with metal plates 369 and 370 which are clamped between insulating blocks 359 and 371. The contact plates 369 and 370 connect respectively to terminal connecting rods 372 and 373 by means of extensions 374 and 375. These rods like the rods 364 are electrically connected as described to individual plug sockets 365. The contacts 358 are normally in electrical contact with fingers 367 and are pushed out of engagement therewith and into engagement with the fingers 368 by the ends of bars 134. Each of said bars carries on its contact actuating end a knob of insulation 376. The manner in which these contacts act to transmit the signals will more fully appear from the electrical diagrams. These machines may be operated one from the other in various ways. In Fig. 70, for example, I have shown diagrammatically a form of line apparatus and transmitting connections, and in Fig. 71, similar line apparatus and receiving connections for operating these machines over a single line wire and earth. Fig. 70 may represent the transmitting connections and Fig. 71, the receiving connections of the same machine, but we will regard them as showing two separate machines, one used as a transmitter at one end of the line and the other as a receiver at the other end of the line.

Referring first to the arrangement shown in Fig. 70, the eight contact springs 358 are electrically connected respectively to eight insulated segments of a commutator 377, shown in development in Fig. 70, and having in the present case ten segments. This commutator forms a part of a rotary sunflower distributer comprising in addition to the commutator 377, collector rings 378 and 379, and a commutator having one long segment 380, and a short segment 381 insulated therefrom. These commutators and collector rings are provided respectively with brushes 382, 383, 384 and 385, all driven by an arm 386 or in any suitable way by the loose member of a clutch 387, which may be the same in construction as the spacing clutch hereinbefore described. The continuously rotating member of this clutch 387 is driven by a small motor 388. This motor is provided with a hand regulating rheostat 389 for adjusting its speed, and in addition to this, may be provided with means to maintain a constant speed or synchronism with some moving mechanism at a distance, as for example, with similar mechanism at some other point on the line.

In the drawings, Figs. 70 and 71, the tuning fork 390, commutator 391, condenser 392, and resistance 393, and connections constitute a synchronizing arrangement for these motors which I have found very satisfactory, but as I do not herein claim this arrangement as a part of my present invention, it need not here be described in detail. The periodic uncoupling of the rotating element of the current distributer as hereinafter described is in itself a sufficient synchronizing means to render the employment of any additional synchronizer in many instances unnecessary. The motor 388 receives its current from a pair of direct current supply mains 394 and 395, as shown. The brushes 382 and 383 are permanently electrically connected together, as are also the brushes 384 and 385. The collector ring 378 is permanently connected to main line conductor 396 extending to the other station; ring 379 is permanently electrically connected to the negative supply main 395, and segment 381 is permanently electrically connected in series with the forward coil of a relay 397 and positive main 394, the said relay controlling the operation of the clapper magnet 354 of the transmitting machine, as hereinafter described. The clutch 387 is controlled by a magnet 398, through mechanism indicated diagrammatically in Fig. 70, but which in actual construction may be the same as that described in relation to the spacing clutch. This clutch magnet controls a movable contact 399 permanently electrically connected to the negative local main 395, and this contact is adapted to, at times, engage a stationary contact 400, permanently connected in series with the back coil of a polar relay 401 and the positive local main 394. The clutch magnet 398 is permanently connected in series between the positive main 394 and the forward stop of relay 401. The forward coil of this relay is permanently connected in series between a segment, (the top one in the diagram) of commutator 377 and the double spring contact 151. The contacts 152 and 153 are connected respectively to two conductors 402 and 403 which are in turn respectively connected one to the positive terminal dynamo 404 or other suitable source of direct current supply, and the other (conductor 402) to the negative terminal of dynamo 405 or other suitable source of direct current. The other terminals of these dynamos are then connected together and through a common conductor 406 to earth, or other suitable return. The eight contacts 367 are all permanently connected to the negative conductor 402 while the contacts 368 are all connected permanently to the positive conductor 403, the said contacts forming eight normally open bridges across said conductors between which are adapted to vibrate the contacts 358 operated by the selector bars 134 and controlled by the keyboard.

Referring now to Fig. 71, the line unit which comprises the commutators 407, 408 and 409, collector rings 410 and 411, with their brushes 412, 413, 414 and 415 driven by motor 416 with its regulating apparatus, and relay 417, of the same construction as the line unit employed in transmitting. The segment 409 when employed in receiving, however, is so adjusted relative to segment 381 at the transmitter, that brush 415 will pass over it (segment 409) after brush 385 passes over segment 381, the reason for which will be pointed out later. The eight segments of the commutator 407 corresponding to the eight segments of the commutator 377 connected to the respective transmitter contacts, are connected respectively in series with both the forward and back coils of a group of eight polar selecting relays 418, and thence to a common conductor 419 connected to earth or to any suitable return to the conductor 406 at the transmitting station. This conductor 419 connects one terminal of the forward coil of relay 417, the other terminal of which is electrically connected to the top segment of commutator 407 corresponding in angular position to the segment of conductor 377 connected to the forward coil of relay 401 at the transmitter. The tongues of the selecting relays 418 are connected each respectively to a terminal of one of the eight recorder magnets 99, while the other terminals of these magnets are all connected to a common conductor 420 connected to the local positive supply main 421.

Segment 409 is permanently electrically connected to contact 153, while contact 151 is connected in series with the forward coil of a relay 422 and the positive supply main 421. This latter relay controls, as hereinafter described, the operation of the recorder spacing magnet 159, which latter, through its contacts 181 and 182 restores the said relay to normal. The forward contacts of the several selecting relays 418 are connected to a common return conductor 423 connected to the negative local supply main 424.

The operation of the apparatus indicated in Fig. 70, in connection with that indicated in Fig. 71 is as follows: The line unit motors 388 and 416 at the two stations rotate continuously and in approximate synchronism, bringing the rotary sunflower brushes at the two ends of the line simultaneously into engagement with corresponding segments at the two stations. Assume first that the brushes 382 and 412 at the two ends of the line are at rest upon the top segment of these commutators as indicated, and that no key is depressed. The circuit completed when said brushes are in this position may be traced as follows: positive brush of dynamo 405 through conductor 406 to earth, conductor 419 (Fig. 71), forward coil of relay 417, top segment of commutator 407, brushes 412 and 413, collector ring 410, line conductor 396, collector ring 378 (Fig. 70) brushes 383—382, top segment of commutator 377, forward coil of relay 401, transmitter contacts 151—152, conductor 402, to negative brush of dynamo 405. Current flowing in this direction, however, causes relays 401 and 417 to send their tongues against their back stops. When a key is operated at the transmitter, which we will assume is the one indicated in Fig. 70, this causes bar 134 to send spring 358 into engagement with contact 368 and also causes spring 151 to break contact with spring 152 and make contact with spring 153. Subsequently, lug 158 (Figs. 40 to 44) causes spring 151 to break contact with spring 153 and make contact with spring 152. When spring 151 makes contact with spring 153, current then passes from positive pole of dynamo 404 through the forward coils of relays 401 and 417, which current, being in an opposite direction from that which traversed said coils in the case above assumed when no key was operated, will cause said relays to send their tongues against their forward contacts, thereby completing the operating circuits of clutch magnets 398 and 398' at the respective ends of the line. The effect of this is to couple the loose to the continuously rotating member of each of the line unit clutches 387 and 387' and thus start the commutator and selector ring brushes at each end of the line to rotating. When the magnet 398 thus becomes energized, it also closes contacts 399 and 400, thereby completing a circuit from the local current supply through the back coil of relay 401, restoring its tongue to its back stop and breaking the circuit through clutch magnet 398. This causes said magnet 398 to release its lever and throw its stop pin in position to disengage the loose from the fast member of the clutch at the end of one revolution thereof, all as fully described with relation to the operation of the recorder spacing clutch. At the end of such revolution the line unit clutch becomes uncoupled with the brush 382 resting on the top segment as shown in Fig. 70. The same operation takes place with reference to the line unit clutch 387 and relay 417 at the receiving station. It will therefore be seen that the line unit brushes start afresh on each revolution, thereby correcting the synchronism between the brushes at the two stations. As brush 382 reaches the segment of its commutator connected to the contact of the key operated, positive current passes from dynamo 404, through contacts 368 and 358 to line, operating the corresponding relay in the bank of selecting relays 418 (Fig. 71). The selecting relays 418 not corresponding to the contact 368 of the key operated, receive current in such direction as to send their tongues against their back stops. The operation of this $h$ selector relay energizes the corresponding $h$ recorder magnet 99, which closes contacts 151 and 153 (Fig. 71) thus partially completing a circuit from the local supply main 421 through the forward coil of relay 422. This circuit is completed when the brush 415 reaches segment 409, thus energizing the forward coil of relay 422 and causing it to close the circuit of the recorder spacing magnet 159 which then operates as fully described to cause the machine to record. When this spacing magnet 159 operates, it closes contacts 181, 182, thus energizing the back coil of relay 422, causing it to break the operating circuit of magnet 159, and restore its own tongue to its back stop. If the top contact 358 alone had been operated, according to the diagram Fig. 2, the recorder would have printed or perforated a signal corresponding to one of the parenthesis marks. In a similar way the selector relays 418 are energized in combinations or singly, as the case may be, corresponding to the contacts 358 operated at the transmitter and act to energize the magnets 99 correspondingly, causing the recorder to record the various signals, it requiring one complete rotation of the line unit commutator brushes to transmit each signal.

The operation of the clapper or key locking mechanism in the present instance is as follows: As soon as brush 385 (Fig. 70) reaches segment 381, a circuit is completed through the forward coil of relay 397. This causes the tongue of said relay to pass to its forward contact and thus complete a circuit current in which energizes the clapper magnet 354, which starts in motion the cam 131$^a$ corresponding to cam 131 (Fig. 5) except that it (cam 131ª) is so placed on the hub of the clapper clutch that in this case it normally withdraws the locking bar 125 from engagement with the key lugs 124, thus normally unlocking the keys. Immediately after this cam starts to rotate, the keys are locked by the bar 125 and remain locked until the clapper clutch has almost completed a revolution. As soon, however, as the clapper clutch magnet 354 operates, it completes a circuit through contacts 353ᶜ and 353ᵈ, thereby sending current through the back coil of relay 397, causing it to break the circuit of the clapper clutch magnet 354. This uncouples the clapper clutch. The keys are therefore locked before the recording is done, since segment 381 comes into action in advance of segment 409, and the keyboard is not unlocked until after the recording operation has taken place.

When the machine shown in Figs. 3 to 69, and described in connection Fig. 70 as a transmitter, is used also as a home recorder, that is to automatically print or print and perforate on a message-blank the message being transmitted, the spacing clutch magnet 159 operates each time that the clapper clutch does. This may be effected either by connecting the spacing clutch magnet in series with the clapper clutch magnet 354 as shown in Fig. 70, or it may be effected by mechanically connecting these clutches or their actuating arms so that each time the clapper clutch operates, the spacing clutch will operate, or this may be effected in any other desired way.

With the key locking arrangement described with reference to Fig. 70, the keys of the keyboard are normally unlocked and therefore free to be operated at will so long as the successive operations do not follow each other too closely. This interval is determined by the time that the clapper clutch takes to make one rotation after its normally fast and loose members have been connected by the operation of a key. Regarding the relative speed of the line unit motors 382—416 and the motors 70, it is in general necessary to drive the latter motors at a somewhat greater velocity than the line unit motors. The extra disconnected segment in each of the commutators 377, 407 may be used for any desired auxiliary signal.

In the foregoing description we have considered the case in which the two machines are operated over a simplex line. These machines, however, as well as the system of line operation described may be operated either in duplex, quadruple, octoplex or other capacity: but as I do not herein claim any of these special modes of operation, it is hardly worth while to go into a description thereof.

It should also be understood that while I have herein shown one specific embodiment only, of my invention, various modifications and changes may be made therein without departing from the spirit of the invention.

What I claim is:

1. A plurality of machines, each comprising recording mechanism, selecting mechanism for controlling said recording mechanism, a plurality of keylevers, mechanical connection between said keylevers and said selecting mechanism for operating said selecting mechanism locally from said keylevers, electrical means for distant control adapted to operate said selecting mechanism independently of its operation locally by said key levers, electrical transmitting mechanism operated from said key levers; and operative connection between the said transmitting mechanism of one of said machines and said electrical operating means of another of said machines.

2. The combination with a recording mechanism, of selecting mechanism comprising a plurality of slotted shiftable combination bars of lesser number than the characters to be recorded and adapted to be operated in combinations corresponding to the characters to be recorded, for controlling said recording mechanism, a plurality of keylevers, means controlled by said keylevers to operate said selecting mechanism locally, a plurality of magnets one for each of said bars adapted to operate said bars independently of their operation locally by said keylevers, and electrical transmitting mechanism controlled from said keylevers.

3. A plurality of machines, each comprising recording mechanism, permutation selecting mechanism adapted to control the operation of said recording mechanism, a keyboard having mechanical means to operate said selecting mechanism locally, electrical means operative independently of said keyboard mechanism to operate said selecting mechanism by distant control, transmitter mechanism controlled from said keyboard, and operative electrical connection from the transmitter mechanism of one machine to the said electrical operating means for the selecting mechanism of another machine.

4. A plurality of machines, each comprising a series of selecting combination bars provided with portions of differing elevations, means by which the position of said bars determines the character to be recorded, impression mechanism controlled by said means, a plurality of magnets as great in number as said selecting bars provided with means for operating said bars in combinations corresponding to the combinations of said magnets energized, a plurality of key levers, selecting mechanism forming operative connection between said levers and said combination bars, transmitter mechanism controlled from said keyboard, and operative electrical connection from said transmitter mechanism of one machine to the said magnets of another machine.

5. A plurality of machines, each comprising constantly running power mechanism, normally idle actuating mechanism, a plurality of recording members from which one at a time is to be selected, a plurality of devices one individual to each of said recording devices to connect the same to said actuating device, a plurality of combination selecting members adapted to select the desired connecting device for a given recording member, means to operate the connecting device thus selected, means including a clutch to connect said actuating mechanism to said power mechanism, means controlled by said combination mechanism to operate said clutch, electrical means comprising a plurality of magnets one individual to each of said selecting members adapted to operate the same, a keyboard comprising a larger number of keys than said magnets, operative connection between said keyboard and said selecting members whereby the latter may be operated by said keyboard independently of said magnets, transmitter mechanism controlled from said keyboard, and electrical connection from the transmitting mechanism of one machine to the said magnets of another machine.

6. A plurality of machines, each comprising recording mechanism, permutation selecting mechanism for controlling said recording mechanism, a plurality of key levers adapted to operate said selecting mechanism locally, a plurality of magnets for distant control adapted to operate said selecting mechanism independently of its operation locally by said key levers, electrical transmitting mechanism comprising a plurality of switches corresponding in number to said magnets and controlled from said key levers, and operative connection between the said transmitting mechanism of one of said machines and the magnets of another of said machines, said connection comprising a line conductor, a source of signaling current, a current distributer coöperating with said transmitting mechanism to impress signals from said source of said line, and a current distributer and means operatively connected to said line and to said magnets to energize the latter in combinations corresponding to the operated contacts of the transmitting mechanism for the respective signals sent over said line.

7. A machine comprising recording mechanism, permutation selecting mechanism adapted to control the operation of said recording mechanism, a keyboard having mechanical means to operate said selecting mechanism locally, electrical means operative independently of said keyboard mechanism to operate said selecting mechanism by distant control, and a plurality of transmitter contacts selectively operated by said permutation mechanism.

8. A machine comprising, in combination, character recording mechanism, selecting mechanism adapted to control the operation of said recording mechanism, said selecting mechanism having a plurality of elements the combining of which determines the character to be recorded, electrical means operatively connected to said elements for distant control, a keyboard mechanically connected to said elements to operate the same manually locally, and electrical signal transmitting mechanism controlled from said keyboard.

9. A machine comprising, in combination, recording mechanism, selecting mechanism adapted to control the operation of said recording mechanism, said selecting mechanism having a plurality of elements the combining of which determines the character to be recorded, electrical means operatively connected to said elements for distant control, a keyboard mechanically connected to said elements to operate the same manually locally, and a plurality of transmitter contacts selectively controlled from said keyboard.

10. A machine comprising in combination, character recording mechanism, selecting mechanism adapted to control the operation of said recording mechanism, said selecting mechanism having a plurality of elements the combining of which determines the character to be recorded, electrical means operatively connected to said elements for distant control, a keyboard mechanically connected to said elements to operate the same manually locally, and a plurality of groups of transmitter contacts, one group for each of said elements, mechanically operated and selectively controlled from said keyboard.

11. A machine comprising printing mechanism, mechanical selecting mechanism to control the operation of said printing mechanism, a plurality of magnets arranged to operate the selecting mechanism, said magnets being of lesser number than the characters the machine is adapted to print, keyboard operated transmitter mechanism comprising a plurality of groups of contacts corresponding in number to said magnets, the combining of which contacts determines the selection of a signal.

12. In an electric telegraph, current distributing apparatus at transmitting and receiving stations comprising in each instance a group of contacts and a relatively movable contact member adapted to engage said contacts successively, a main line connecting the said member at the transmitting station with the one of the receiving stations, a machine at each of said stations comprising recording mechanism, selecting mechanism for controlling said recording mechanism, a plurality of key levers adapted to operate said selecting mechanism, a plurality of magnets, one for each contact in the respective distributer groups, for operating said selecting mechanism from a distance, electrical transmitting mechanism controlled from said key levers and comprising groups of contacts, one for each of said magnets, electrical connection from said contacts to the contacts of the transmitting current distributer, electrical connection from the said magnets to the contacts of the receiving current distributer, and a source of signaling current operatively connected to said transmitter contact connections.

13. A positive and a negative current supply terminal, a plurality of contacts normally in electrical connection with one of said terminals, keyboard operated permutation mechanism adapted to effect electrical connection between said contacts and the other terminal in combinations to form the signals, a series of current distributer contacts electrically connected respectively to said first named contacts, a relatively movable contact member adapted to engage said distributer contacts successively, a main line connection to said contact member, a continuously rotating shaft, a clutch adapted to couple said contact member mechanically to said shaft, in combination with a similar series of current distributer contacts and relatively movable contact members adapted to engage the same and connected to said line at another point thereon, a continuously rotating shaft and clutch adapted to couple said second contact member mechanically to its continuously rotating shaft, and means controlled by current sent out at periodic intervals from one of said supply terminals to operate said clutches to disconnect the said distributer contact members from their driving power at regularly recurring intervals, and means to cause said clutches to automatically couple said members to their driving power at regular intervals after being thus disconnected.

14. In an electric telegraph, current distributing apparatus at transmitting and receiving stations comprising in each instance a group of contacts and a relatively movable contact member adapted to engage said contacts successively, a main line connecting the said member at the transmitting station with the one of the receiving stations, a positive and a negative current supply terminal at the transmitting station, a plurality of transmitter contacts normally in electrical connection with one of said terminals and connected respectively to the transmitter current distributer contacts, keyboard operated means adapted to break said electrical connections with said terminal and effect connection between said keyboard controlled contacts and the other terminal in combinations corresponding to the respective signals, a plurality of selecting relays at the receiving station connected in circuit respectively with the current distributer contacts at that station, all of said relays being connected to both of said transmitter terminals, substantially as described.

15. A plurality of machines, each comprising a series of selecting combination bars provided with portions of differing elevations, means by which the position of said bars determines the character to be recorded, impression mechanism controlled by said means, a plurality of magnets one for each of said bars for operating said bars in combinations corresponding to the combinations of said magnets energized, a plurality of keylevers, selecting mechanism forming operative connection between said levers and said combination bars, transmitter mechanism controlled from said keyboard, and operative electrical connection from said transmitter mechanism of one machine to the said magnets of another machine.

16. A machine comprising recording mechanism, permutation selecting mechanism adapted to control the operation of said recording mechanism, a keyboard having means to operate said selecting mechanism locally, electrical means operative independently of said keyboard mechanism to operate said selecting mechanism by distant control, and a plurality of transmitter contacts selectively operated by said permutation mechanism.

17. A combined telegraph transmitter and recorder, comprising recording mechanism, a series of combination bars to control the operation of said recording mechanism, a series of magnets one individual to each of said bars for operating the same in combinations corresponding to the combinations of magnets energized, a second series of bars corresponding in number to the first series, transmitting mechanism controlled by the second series of said bars, a series of keylevers to operate said second series of bars and permutation means whereby the operation of a given keylever operates a given combination of said second series of bars, and therethrough, a corresponding combination of the first named bars.

18. A combined recording and transmitting machine comprising signal recording mechanism, mechanical selecting mechanism to control the operation of said recording mechanism, a plurality of magnets arranged to operate said selecting mechanism, said magnets being of lesser number than the characters the machine is adapted to record, a series of transmitting switches, there being one of said magnets for each of said switches, a keyboard for controlling said switches and mechanism operative by said keyboard for controlling said recording mechanism for making a home record of the signals transmitted by said switches; in combination with a series of circuits in which said switches are individually connected, a main line, a source of signaling current, and a current distributer connecting said switch circuits successively to said line.

In testimony whereof I affix my signature in presence of two witnesses.

LOUIS MAXWELL POTTS.

Witnesses:
 JOHN H. HOLT,
 FRANCIS S. MAGUIRE.